(12) United States Patent
Aird et al.

(10) Patent No.: US 12,210,445 B2
(45) Date of Patent: Jan. 28, 2025

(54) SYSTEM AND METHOD FOR EVALUATING TEST RESULTS OF APPLICATION TESTING

(71) Applicant: The Toronto-Dominion Bank, Toronto (CA)

(72) Inventors: Kevin Aird, Toronto (CA); Aayush Kathuria, Brampton (CA); Periyakaruppan Subbunarayanan, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 218 days.

(21) Appl. No.: 17/808,417

(22) Filed: Jun. 23, 2022

(65) Prior Publication Data

US 2023/0418734 A1 Dec. 28, 2023

(51) Int. Cl.
*G06F 11/36* (2006.01)
*G06F 11/34* (2006.01)

(52) U.S. Cl.
CPC ...... *G06F 11/3692* (2013.01); *G06F 11/3409* (2013.01); *G06F 11/3664* (2013.01); *G06F 11/3688* (2013.01)

(58) Field of Classification Search
USPC .................................. 717/124–135
See application file for complete search history.

(56) References Cited

U.S. PATENT DOCUMENTS 9,596,146 B2   3/2017  Coates et al.
10,489,279 B2  11/2019 Rajagopalan et al.
(Continued)

FOREIGN PATENT DOCUMENTS

| CN | 112148616 A | 12/2020 |
|---|---|---|
| CN | 113742226 A | 12/2021 |
| CN | 113806205 A | 12/2021 |

OTHER PUBLICATIONS

X. Bai, H. Lu, Y. Zhang, R. Zhang, L. Hu and H. Ye, "Interface-Based Automated Testing for Open Software Architecture," 2011 IEEE 35th Annual Computer Software and Applications Conference Workshops, Munich, Germany, 2011, pp. 149-154. (Year: 2011 ).*

(Continued)

*Primary Examiner* — Andrew M. Lyons
(74) *Attorney, Agent, or Firm* — CPST Intellectual Property Inc.; Brett J. Slaney

(57) ABSTRACT

A method and device for automating analysis of executed performance testing is disclosed. The device includes a processor, and a communications module and memory coupled to the processor. The memory stores computer executable instructions that when executed by the processor cause the processor to receive an input associated with executing a performance test of an application. The processor identifies a test analysis template from a plurality of test analysis templates based on the performance test or the application, each test analysis template defining analysis parameters for interpreting results of executed performance tests. The processor creates a session for analyzing a result of the performance test being executed. Within the analysis session, one or more models are applied to the result, where the one or more models are responsive to the analysis parameters. The processor generates a performance analysis report based on the applied one or more models.

20 Claims, 24 Drawing Sheets

(56) References Cited

U.S. PATENT DOCUMENTS

| | | |
|---|---|---|
| 10,678,666 B1 | 6/2020 | Gauf et al. |
| 10,705,800 B2* | 7/2020 | Brunel ................ G06F 11/3604 |
| 11,074,165 B2 | 7/2021 | Khakare et al. |
| 11,080,157 B1* | 8/2021 | Roberts .................. H04L 41/14 |
| 11,221,941 B2 | 1/2022 | Dao |
| 11,237,951 B1 | 2/2022 | Tatunashvili et al. |
| 2002/0174414 A1* | 11/2002 | Matsuo ............... G06F 11/3684 |
| | | 714/E11.208 |
| 2005/0137842 A1* | 6/2005 | Bingham ............ G06F 11/2294 |
| | | 703/21 |
| 2015/0031332 A1* | 1/2015 | Clark .................... H04W 12/12 |
| | | 455/411 |
| 2017/0075790 A1* | 3/2017 | Macleod ............. G06F 11/3664 |
| 2021/0311859 A1 | 10/2021 | DeSousa Bispo et al. |
| 2021/0326244 A1 | 10/2021 | Stocker et al. |
| 2021/0326247 A1 | 10/2021 | Mohankumar et al. |
| 2021/0357508 A1 | 11/2021 | Elovici et al. |
| 2022/0100649 A1* | 3/2022 | Pönitsch ............. G06F 11/3688 |
| 2022/0121560 A1* | 4/2022 | Tetreault .............. G06F 11/3664 |
| 2022/0138081 A1* | 5/2022 | Varma ................ G06F 11/3684 |
| | | 717/124 |

OTHER PUBLICATIONS

J. Cohen et al., "TemPSS: A Service Providing Software Parameter Templates and Profiles for Scientific HPC," 2015 IEEE 11th International Conference on e-Science, Munich, Germany, 2015, pp. 78-87. (Year: 2015).*

Ferme, Vincenzo; Pautasso, Cesare; A Declarative Approach for Performance Tests Execution in Continuous Software Development Environments; Load Testing and Benchmarking pp. 261-272; Apr. 9-13, 2018; https://dl.acm.org/doi/abs/10.1145/3184407.3184417.

* cited by examiner

Test Analysis Templates

| All | ☒ Pending | ⊘ Rejected | ✓ Reviewed | 502 | | | Start a new test analysis template 504 |
|---|---|---|---|---|---|---|---|

| Template Label | Test Type | Last Modified | Review | Actions |
|---|---|---|---|---|
| CBF - Peak Run 4a | Peak | Jul 22, 2018 by PURV02 | ⚠ Not Submitted | |
| CBF - Peak Run 4 | Peak | Jul 21, 2018 by PURV02 | ⚠ Not Submitted | |
| Doc Server Upgrade - Peak - Run 3 | Peak | Jul 21, 2018 by PURV03 | ⚠ Not Submitted | |
| CBF - Peak day 2 | Peak | Jul 19, 2018 by PURV02 | ⚠ Not Submitted | |
| Doc Server Upgrade - Peak 1 | Peak | Jul 19, 2018 by PURV02 | ⚠ Not Submitted | |
| 89/PC, 89/pv - Tuning | Tuning | Jul 24, 2018 | ⚠ Not Submitted | |
| 89/PC, 89/pv - Tuning | Tuning | Jul 24, 2018 | ⚠ Not Submitted | |
| Doc Server Upgrade - Soak day 2 | Soak | Jul 16, 2018 by ARDK2 | ⚠ Not Submitted | |
| CBF - Soak | Soak | Jul 24, 2018 | ⚠ Not Submitted | |

FIG. 5

To: Rep1
From: Auto Analysis
Subject: Testing Results for Soak Test of Platform 1 Run May 31, 2018 (first-test)

Attachments: Excel File – Interim performance results
Attachments: PDF File – Capacity Report
Attachments: Excel File – GC Report

| |
|---|
| Test Outcome: there are 5 fell transactions, across 4 products. No pattern or impact to performance. GC overhead exceeded recommended levels, and are flagged as a warning. Inconclusive GC result due to non-global GC's occurring at CPC1APT02 |
| Next steps: retrieve detailed timing logs from AP. API system logs for analysis. Review results of project team. |

| |
|---|
| High-level |
| objective: to verify the performance characteristics of the application under test during extended periods of usage. |
| detailed: test type (soak), TPS (0.58), Vusers(72), date/time (May 21, 2022, 2 to 5PM). |
| Response time service agreements: N/A |
| detailed: 0 out of 0 transactions have met their response time SLA. (20 transactions do not have an SLA defined |
| capacity: acceptable |
| middleware: warning |
| DBA: TBD |

FIG. 8

Observations

B / *I* ↰ ↱ ⋮⋮⋮ ⋮⋮⋮

Charts ▾  Tables ▾

Running Vusers

Average Transaction Response Time

Total Transactions per Second

Errors per Second

Throughput

- Observation 1
- Observation 2
- Observation 3

Steady users for 2 hours

SYSTEM AND METHOD FOR EVALUATING TEST RESULTS OF APPLICATION TESTING

CROSS-REFERENCE TO RELATED APPLICATION(S)

This application claims priority to Canadian Patent Application No. 3,165,219 filed on Jun. 23, 2022, the contents of which is incorporated herein by reference in its entirety.

TECHNICAL FIELD

The following relates generally to testing of applications, and more specifically to evaluation of results generated by application testing.

BACKGROUND

Application testing can include various personnel (e.g., test planning, test execution, and test interpretation personnel, etc.) and resources (e.g., testing scripts, application versions, computing environments for testing, etc.) operating potentially asynchronously, all of which can be difficult to coordinate.

The different personnel and resources may be isolated or separated. A single application testing environment can feature fragmented or disjointed applications or tools, and this issue is exacerbated in larger institutions implementing a variety of and/or large number of testing environments. For example, tools used by one set of personnel may be incompatible or difficult to integrate with a tool used by other groups of personnel.

The different tools can provide outputs or implement functionalities which are difficult to integrate with one another. For example, an output of a first tool can be such that incorporation into another tool is difficult (e.g., access to the output is restricted, or the output uses a format that is difficult to integrate).

Performance test evaluation, as a final component, can be poorly integrated with application testing processes. Unnecessary work, such as resources allocated to tasks which are not used to evaluate performance tests, or duplicative work, can result from segregation. Moreover, integration of test evaluation tools with other existing tools or resources, including data access, computing resources, scripts, etc., can be difficult or complex, and costly.

The disjointed architecture can also make it difficult to retain and improve upon testing for future use cases. Models applied by different tools or within certain computing environments can be difficult to update or to incorporate into new use cases.

Application testing which enables faster, less expensive, more meaningful test evaluations, which test evaluations may be more easily integrated or facilitate easier adjustments, are desirable.

BRIEF DESCRIPTION OF THE DRAWINGS

Embodiments will now be described with reference to the appended drawings wherein:

FIG. 5 is an image of an example test analysis template graphical user interface.

FIG. 8 is an image of an example performance analysis report.

FIGS. 9-19 are each an image of various example aspects of a visualization associated with analysis of executed performance testing.

DETAILED DESCRIPTION

Figure 1:
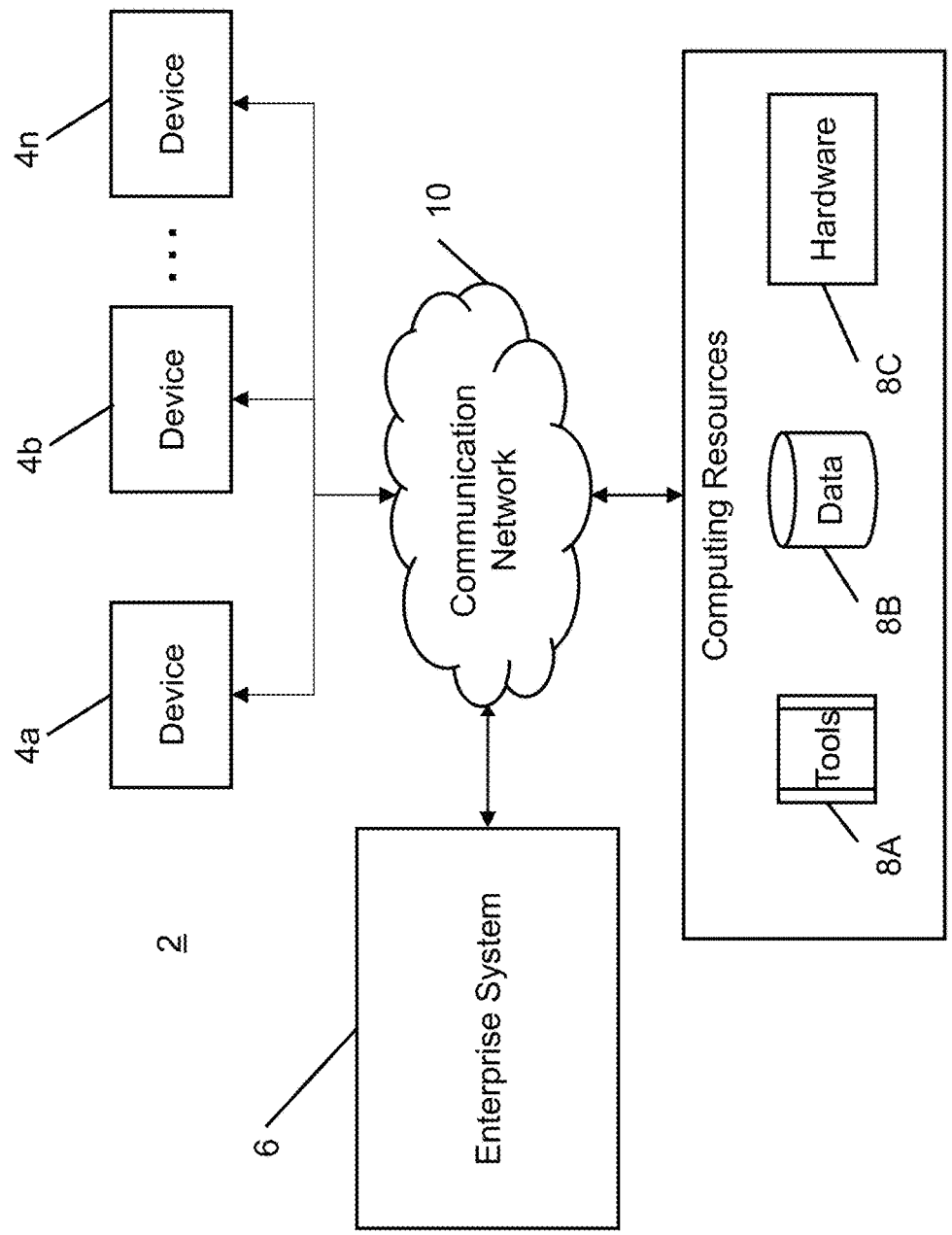
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The following generally relates to a framework for analyzing results of executed performance tests (referred to in the alternative as test results) of application(s). The application(s) can be tested pursuant to an automated testing regime. For example, the automated testing regime may automatically determine the types of tests, and schedule execution of the determine tests.

As used herein, the term "performance test" may refer to various types of testing of an application. The term is not limited to tests of the software's efficiency, but is understood to include tests that assess an application's performance in consideration of hardware directly or indirectly utilized as a result of the running of the application. For example, an example application may complete a particular task by relying upon communication hardware and related firmware to communicate with a server to retrieve certain information. The performance test of the application can incorporate or test the performance of the application as a whole, including the application's interaction with the communication hardware (e.g., does the application use the hardware efficiently) and reliance thereon (e.g., does the application expect unrealistic performance of the communication hardware in order to complete certain functionality within a certain timeframe). The term test results is similarly understood to include a variety of types of test results.

The disclosed framework includes identifying a test analysis template from a plurality of test analysis templates based on the performance test being implemented or based on the application under test. The test analysis template includes one or more parameters which define the analysis of the test results.

Test analysis templates, and the parameters therein, may facilitate integration of the testing processes by requiring different tools and applications to interact with or comply with the template architecture. For example, these tools can provide a plug in or output data in a manner that allows for access to the test analysis templates and tools associated therewith. This can also have the effect of standardizing the mechanisms and features used to evaluate test results.

Moreover, the disclosed framework can potentially beneficially allow for effective updating of models used to test applications. Templates, denoting the required functionality, being associated with a test or an application, can be used or imported into similar tests or applications to transfer changes, updates, or adjustments learned from previous implementations without having access to the underlying data used to learn the changes, updates, or adjustments. In some example embodiments, test templates are based on or integrated with an application inventory which stores specific application parameters. Updates of the application inventory can therefore allow for updating of templates, and can also facilitate cross-functionality of the templates based on application inventory similarity.

In the result, the template framework can possibly facilitate faster tests, or more meaningful test evaluations with metrics that are capable of easier comparison to previous tests, and can be more easily integrated or facilitate easier updates.

In one aspect, a device for automating analysis of executed performance testing is disclosed. The device includes a processor, a communications module coupled to the processor, and a memory coupled to the processor. The memory stores computer executable instructions that when executed by the processor cause the processor to receive an input associated with executing a performance test of an application. The processor identifies a test analysis template from a plurality of test analysis templates based on the performance test or the application, each test analysis template defining analysis parameters for interpreting results of executed performance tests. The processor creates a session for analyzing a result of the performance test being executed. Within the analysis session, one or more models are applied to the result, where the one or more models are responsive to the analysis parameters. The processor generates a performance analysis report based on the applied one or more models.

In example embodiments, the processor provides the performance analysis report to a dashboard which provides results of an automated testing process. In example embodiments, the dashboard aggregates the performance analysis report with reports from previous sessions associated with the application, or an associated project.

In example embodiments, the performance test is an interim performance test which tests the application in a simplified environment, and the performance test analysis report is in the form of an email.

In example embodiments, the processor provides a testing template user interface listing at least one of the test analysis templates, an available existing test analysis template, and a tool to create a new test analysis template.

In example embodiments, the processor automatically executes the performance test in response to determining the input is from a microservice associated with performance testing.

In example embodiments, the test analysis template is adjusted based on adjustments within an application inventory defining operating parameters of the application.

In example embodiments, the input is for executing more than one performance test, and the processor creates separate analysis sessions for each executed performance test of the more than one performance tests.

In example embodiments, the processor detects a test engine associated with the performance test, and the aforementioned analysis session is configured to receive output in a form output by the detected test engine.

In example embodiments, the analysis session is associated with the results, and a designated user account.

In example embodiments, the analysis parameters define a format of the performance analysis report.

In example embodiments, the analysis parameters define criteria associated with one or more of capacity analysis, middleware analysis, database analysis, testing iteration performance, service requirements of the application, and service requirements of a project associated with the application.

In another aspect, a method for automating performance testing analyses is disclosed. The method includes receiving an input associated with executing a performance test of an application and identifying a test analysis template from a plurality of test analysis templates based on the performance test or the application. Each test analysis template defines analysis parameters for interpreting results of executed performance tests. The method includes creating a session for analyzing a result of the performance test being executed. Within the analysis session, one or more models are applied to the result, with the one or more models being responsive to the analysis parameters. The method includes generating a performance analysis report based on the applied one or more models.

In example embodiments, the test analysis template is adjusted based on adjustments within an application inventory defining operating parameters of the application.

In example embodiments, the method includes providing the performance analysis report to a dashboard which provides results of an automated testing process. In example embodiments, the dashboard aggregates the performance analysis report with reports from previous sessions associated with the application, or an associated project.

In example embodiments, the performance test is an interim performance test which tests the application in a simplified environment, and the performance test analysis report is in the form of an email.

In example embodiments, the input is for executing more than one performance tests, and the method includes creating separate analysis sessions for each executed performance test of the more than one performance tests.

In example embodiments, the method includes detecting a test engine associated with the performance test, and the aforementioned created analysis session is configured to receive output in a form output by the detected test engine.

In another aspect, a computer readable medium for automating performance testing analyses is disclosed. The computer readable medium includes computer executable instructions for receiving an input associated with executing a performance test of an application. The instructions are for identifying a test analysis template from a plurality of test analysis templates based on the performance test or the application. Each test analysis template defines analysis parameters for interpreting results of executed performance tests. The instructions are for creating a session for analyzing a result of the performance test being executed. Within the analysis session, one or more models are applied to the result. The one or more models are responsive to the analysis parameters. The instructions are for generating a performance analysis report based on the applied one or more models.

Referring now to FIG. 1, an exemplary computing environment 2 is illustrated. In the example embodiment shown, the computing environment 2 includes one or more devices 4 (shown as devices 4a, 4b, ... 4n), enterprise system 6, and computing resources 8 (shown individually as tools 8A, database 8B, and hardware 8C). Each of these components can be connected by a communications network 10 to one or more other components of the computing environment 2. In at least some example embodiments, all of the components shown in FIG. 1 are within the enterprise system 6.

The one or more devices 4 (hereinafter referred to in the singular, for ease of reference) can be a device 4 operated by a client, or another party which is not controlled by the enterprise system 6, or at least one device 4 of a plurality of devices can be internal to the enterprise system 6. For example, the enterprise system 6 can contract a third-party to develop an application for their organization via a device 4a but perform testing internally to meet proprietary or regulatory requirements via device 4b. Similarly, an organization that develops an application may outsource the testing stages, particularly when testing is performed infrequently.

The device 4 can access the information within the enterprise system 6 in a variety of ways. For example, the device 4 can access the enterprise system 6 via a web-based application, a dedicated application, and access can require the provisioning of various types of credentials (e.g., login credentials, two factor authentication, etc.). In example embodiments, each device 4 can be provided with a unique amount (and/or with a particular type) of access. For example, the device 4a internal to the organization can be provided with a greater degree of access compared to the external device 4b.

Device 4 can include, but is not limited to, one or more of a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 10 shown by way of example in FIG. 1.

The computing resources 8 include resources that service the enterprise system 6 that are stored or managed by a party other than proprietor of the enterprise system 6 (hereinafter referred to simply as the external party). For example, the computing resources 8 can include cloud-based storage services (e.g., database 8B) and other cloud-based resources available to the enterprise system 6. In at least some example embodiments, the computing resources 8 include one or more tools 8A developed or hosted by the external party. For example, the tools 8A can include load testing tools such as HP™'s LoadRunner™, Performance Center, Apache™'s JMeter™, Parasot™'s Loadtest™, and Webload™. The tools 8A can include Dynatrace tools for automated analysis, IBM or Splunk tools for automated garbage collection log analysis, and automated capacity analysis tools such as Capacity Management. The computing resources 8 can also include hardware resources 8C, such as access to processing capability within server devices (e.g., cloud computing), and so forth.

Communication network 10 may include a telephone network, cellular, and/or data communication network to connect different types of client devices. For example, the communication network 10 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet). The communication network 10 may not be required to provide connectivity within the enterprise system 6 wherein an internal network provides the necessary communications infrastructure.

The computing environment 2 can also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications carried out by the enterprise system 6.

The cryptographic server may be used to protect data within the computing environment 2 (including data stored in database 8B) by way of encryption for data protection, digital signatures or message digests for data integrity, and by using digital certificates to authenticate the identity of the users and entity devices with which the enterprise system 6 or the device 4 communicates to inhibit data breaches by adversaries. It can be appreciated that various cryptographic mechanisms and protocols can be chosen and implemented to suit the constraints and requirements of the particular enterprise system 6 and device 4 as is known in the art.

The enterprise system 6 can be understood to encompass the whole of the enterprise, a subset of a wider enterprise system (not shown), such as a system serving a subsidiary, or a system for a particular branch or team of the enterprise (e.g., a software testing division of the enterprise). In at least one example embodiment, the enterprise system 6 is a financial institution system (e.g., a commercial bank) that provides financial services accounts to users and processes financial transactions associated with those financial service accounts. Such a financial institution system may provide to its customers various browser-based and mobile applications, e.g., for mobile banking, mobile investing, mortgage management, etc.

The enterprise system 6 can request, receive a request to, or have implemented thereon performance testing of an application. In existing solutions, the results of the performance testing are thereafter manually reviewed. In some existing solutions, no effort is made to ensure that the results of the performance testing are capable of integration with other tools or functionality within the enterprise system 6 or the device 4. Moreover, in some existing applications, no effort may have been made to facilitate multi-party review of the results, and similarly no effort may have been made to take into consideration the technical means used by the parties to access the results.

Figure 2:
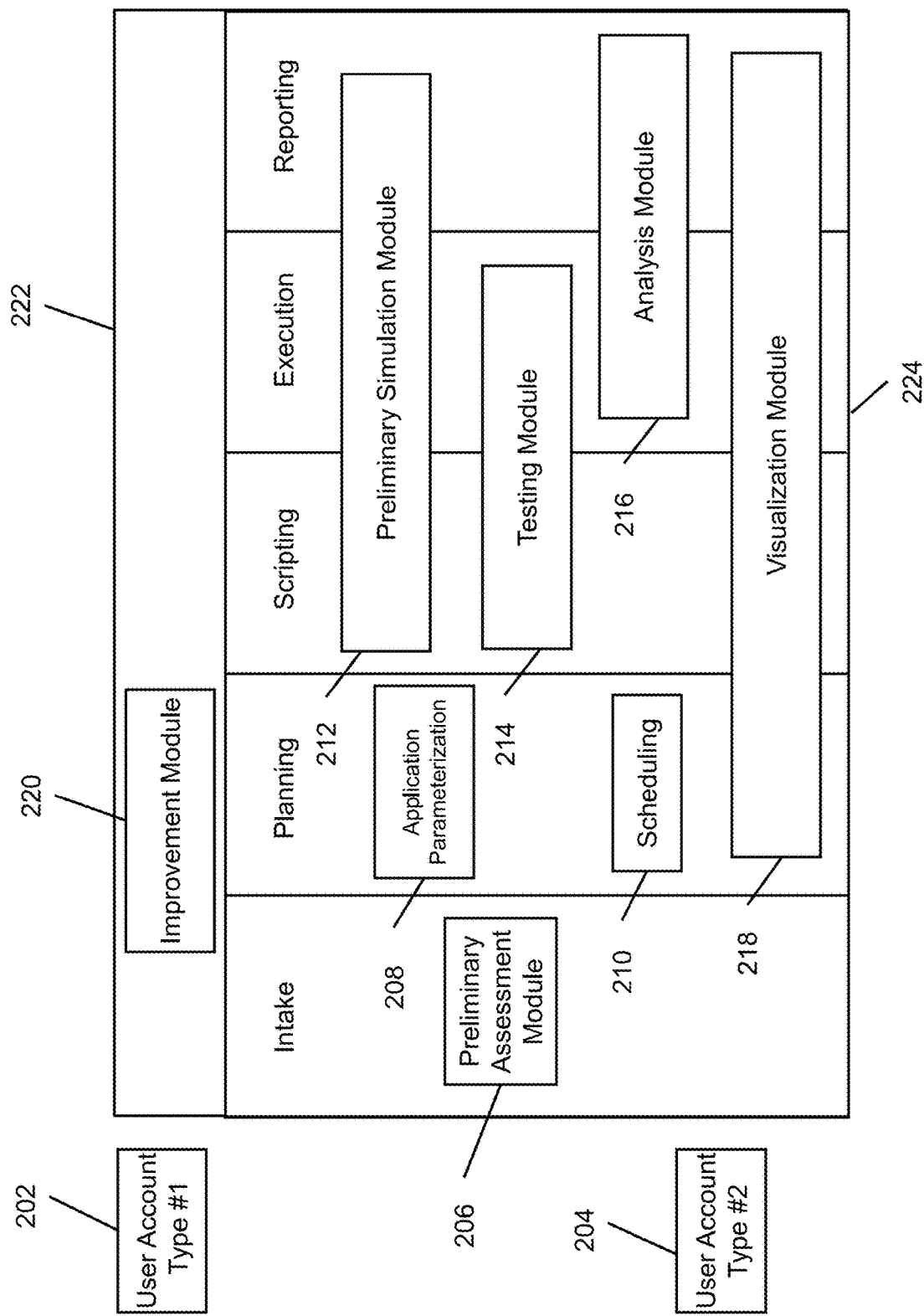
FIG. 2 is a schematic diagram of an example configuration for automating analysis of executed performance testing.

Referring now to FIG. 2, an example configuration for analyzing executed performance testing is shown. To enhance visual clarity, connecting lines between the shown elements are omitted; however, examples of such connectivity are described herein.

In the shown embodiment, the configuration contemplates two different applications or environments for different user types: a first environment 222 for a first user account type 202 (e.g., based on log in credentials of the device 4), and a second environment 224 for a second user account type 204. In at least some example embodiments, the first user account type 202 is an account associated with a performance engineer or test evaluator, and the second user account type 204 is an account type associated with a member of a performance testing team or a project delivery team.

At block 206, an application, or a change to an application is proposed (e.g., the intake phase). Various members of a team sharing the same user account type 202 may determine whether performance testing may be required. For example, performance testing may be required where the aforementioned application or changes are (1) expected to impact or interact with a minimum number of other applications or tools (i.e., the application or changes have a complexity that supports testing), or (2) expected to impact or interact with existing applications or tools which are of an elevated importance (e.g., the changes impact a ledger storing login credentials, and changes that impact the login credential ledger have a low tolerance for error), etc.

Where performance testing is required, the remaining phases of the configuration may be completed, as denoted by the remaining blocks. Moreover, it is understood that one or more blocks shown may be completed in a different order or may be performed simultaneously. For example, block 208 and block 210, as described herein, may be performed simultaneously.

At block 208, the application or change to the application proposed is at least in part parameterized. For example, the application can be parameterized to specify testing evaluation criteria, such as load profiles and required levels of operations (e.g., as defined by a contract, or other instrument imposing operational requirements), and dependencies upon which the application relies.

Figure 3:
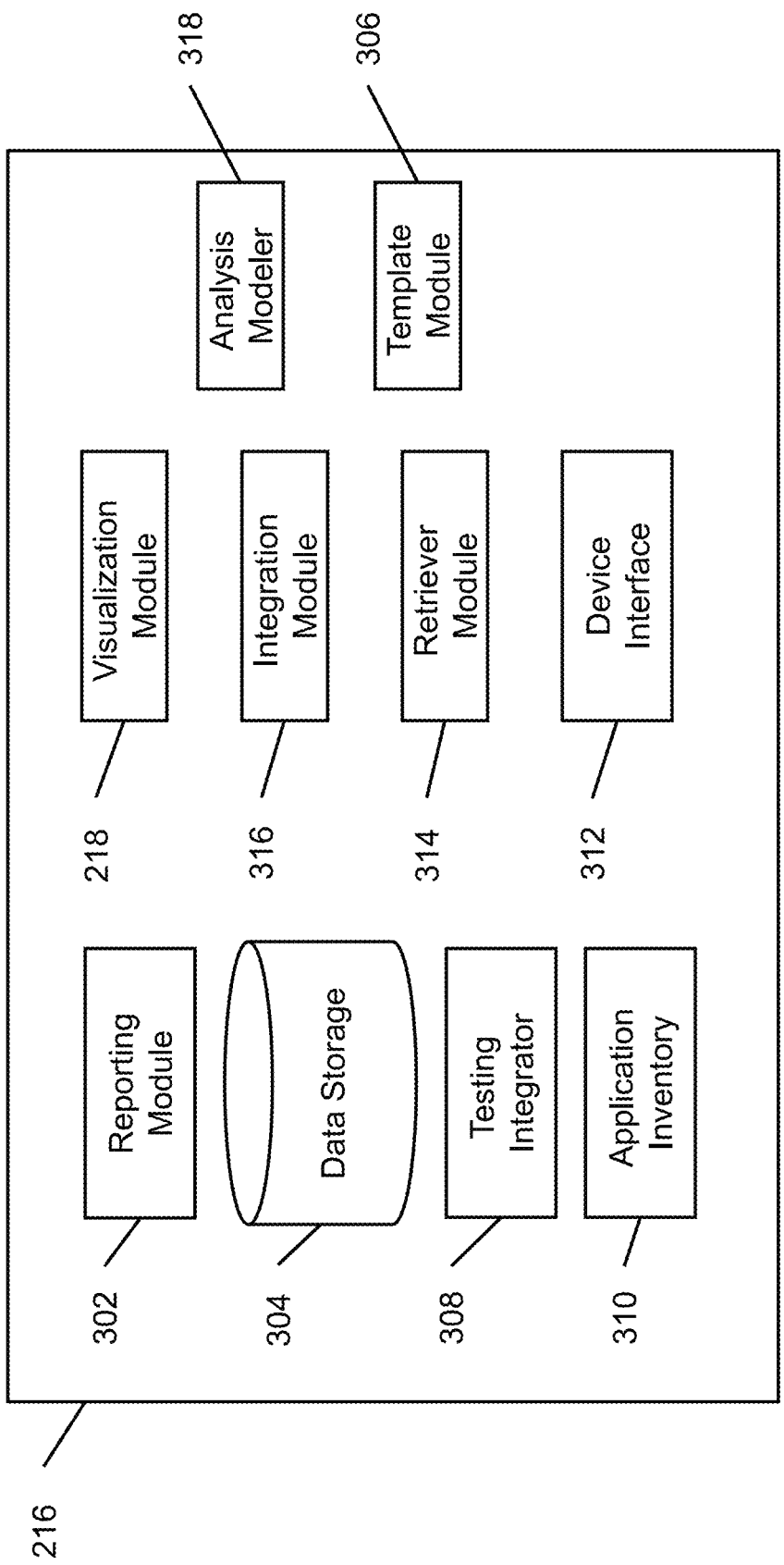
FIG. 3 is a block diagram of an example configuration of an analysis module.

These parameters may be stored in an application inventory (e.g., FIG. 3).

At block 210, resources required for the performance testing may be scheduled. In example embodiments, the resources can include computing resources (e.g., certain computing resources 8, for a certain time), personnel resources (e.g., test planning personnel), and so forth. The resulting schedule can be stored and updated periodically, so that all users associated with the configuration are kept informed of developments in the schedule.

In example embodiments, certain users having the second user account type 204 may have access to various performance testing configurations, such that they can access scheduling information related to a plurality of performance tests.

At block 212, a preliminary simulation of the performance test may be conducted. For example, the preliminary simulation can be a simulation generated by analyzing the sample results of a scaled-down performance test in a simplified computing environment.

At block 214, where the preliminary simulation indicates that the performance test is worthwhile to implement (e.g., there is a satisfactory likelihood that the application can pass the required performance metrics), or satisfies certain criteria ranges, the performance test may be developed and subsequently executed by a testing module. In example embodiments, the developed performance test is triggered or initiated in response to input from micro-service associated with the analysis module 216.

Results of the executed performance testing are thereafter provided to the analysis module 216.

Hereinafter, for clarity, the term "simulation result" may be used to refer to the results generated by the operation of block 212, "test result" may denote the results generated by the operation of block 214, and "analysis result" may be used to refer to the output of the analysis module 216.

FIG. 3 shows an example configuration analysis module 216. In at least some example embodiments, the analysis module 216 is hosted within the enterprise system 6, and can include a reporting module 302, a database 304, a testing integrator 308, an application inventory 310, and a device interface 312.

The device interface 312 facilitates communication with the device 4. In at least some example embodiments, the device interface 312 includes various application programming interfaces (APIs) to facilitate communication with the device 4 via various channels. For example, the device interface 312 can allow for the device 14 to access the enterprise system 6 via a web browser application 2018 (see, e.g., FIG. 20).

The application inventory 310 includes, as alluded to in respect of FIG. 2, parameters of one or more applications, and/or the applications themselves. In at least one example embodiment, the application inventory also stores parameters associated with analyzing test results for each application in the application inventory 310. For example, the application inventory 310 can store a web application and related parameters including parameters defining one or more of an application identifier (e.g., application name, build number, etc.), related application templates (e.g., macro assembly language (MAL) code), a sponsor line of business (LOB), an application category identifier (e.g., a web application, a web service API, etc.), one or more testing evaluation parameters (e.g., criteria derived from a service level agreement, a baseline, a previous testing history, etc.), one or more testing parameters (e.g. performance assets such as load profile data, load test scripts, service virtualization, data creation scripts, application specific knowledge, names associated with test types such as a Dynatrace system profile names, transaction names, or details of the infrastructure for various environments to be used in testing, etc.). The parameters associated with test result evaluation can include parameters mapping applications relationships to their end-users and to dependent software.

In example embodiments, the application inventory 310 serves as a repository for all applications that have gone through the assessment described in block 206 and can be accessed by the device 4 to generate a graphical user interface (GUI) to display historical information. The GUI can display, for example: a history of previous engagements connected to a particular application, all previous reports analyzing test results, an overview of the consumers/dependencies for the particular application, and links to previously built assets such as scripts, sv assets, data creation scripts, etc.

The testing integrator 308 facilitates communications with a testing module (not shown) for performing tests. In at least some example embodiments, the testing integrator 308 facilitates communicating with the testing module to initiate testing, including initiating a variety of testing types. For example, the variety of tests can include one or more of load tests, soak tests, break tests, etc. Each of the variety of performance tests can be performed according to a variety of testing software, whether internal to the enterprise system 6 or external thereto. For example, the load tests can be implemented with one of Loadrunner, JMeter, K6, Artillery, InfluxDB, Gatling, etc.

The database 304 can store data, tools, applications, etc., required for analyzing test results. For example, the database 304 can store the application inventory 310. In example embodiments, the database 304 stores the raw test results. In other example embodiments, the database 304 stores the configuration data used for testing, test analysis templates, analysis results, reports, etc. In at least some example embodiments, the database 304 is either in part or in whole stored on the external computing resources 8.

The reporting module 302 includes one or more parameters for generating notifications based on the analysis results generated by the analysis module 216. For example, the reporting module parameters can define a format of the notification (e.g., email, SMS message, etc.), the content of the notification (e.g., parameters that require indication of whether criteria were met, which tests were run, etc.), timing associated with the notification, which individuals should be notified of the analysis results (e.g., project management personnel, testing personnel), and so forth.

The analysis module 216 consumes the test results to generate analysis results. The analysis results can be formatted for reporting as a performance analysis report. The analysis results can be generated by the use of one or more of a retriever module 314, an integration module 316, a template module 306, an analysis modeler 318, and a visualization module 218.

The retriever module 314 can retrieve the test results stored other than within the analysis module 216. For example, the retriever module 314 can be configured with credentials to access a repository containing test results of load testing performed by a third party. The retriever module 314 can work in an automated fashion and retrieve test results upon being notified of, or upon detecting the creation of new test results. In at least some example embodiments, the retriever module 314 is configured to automatically retrieve test results, to simultaneously or asynchronously retrieve test results from various different tests, etc. It is understood that the test results can include expected outcomes of a test (e.g., connection successfully established), and other data associated with the test (e.g., garbage collection logs, etc.), and that the retriever module 314 can be configured to retrieve some or all of the test results.

The integration module 316 includes one or more parameters to integrate or modify test results for consumption by the analysis modeler 318. For example, integration module 316 can include parameters to standardize test results received from Loadrunner, JMeter, K6, Artillery, InfluxDB, or Gatling load test engines, monitoring and performance profiling tools such as Dynatrace, AppDynamics, Jaeger, Open tracing, Prometheus, Splunk, etc.

Integration module 316 can also include parameters to integrate or modify the analysis results of the analysis modeler 318 for consumption by the reporting module 302. For example, the integration module 316 can format the analysis results of the analysis modeler 318 into an excel file in accordance with the reporting module 302 parameters. In at least some example embodiments, the integration module 316 facilitates the analysis results of the analysis modeler 318 being consumed by the visualization module 318.

The analysis modeler 318 includes one or more models that can be applied to the test results. The one or more models can, for example, compare the current test results of the application with earlier test results (e.g., stored in the application inventory 310). The one or more models can include instructions to compare the raw test results to the performance criteria or parameters to determine compliance or satisfaction of the criteria or parameters. For example, the analysis model can compare received garbage collection logs to determine whether the memory usage of the application under test are satisfactory.

In addition, the one or more models can include models to format or otherwise manipulate the data to comply with the test analysis templates. For example, the output of the analysis modeler 318 may be a report with the test results, the location of any test data, and a populated test analysis template.

In at least some example embodiments, the one or more models may cooperate with the integration module 316 or the retriever module 314 to recover data ancillary to testing. For example, the performance test script itself may not provide for collecting so called garbage collection logs in order to assess the performance test. In such scenarios, and similar scenarios, the one or more models may be configured to recover all information ancillary to the performance test to generate the analysis results.

The one or more models can be at least in part provided by third party provider. For example, the one or more models may reflect a DynaTrace analysis, garbage collection analysis from a third-party provider, or capacity analysis from a third party provider, which analysis can be completed after a performance test is conducted.

The one or more models may be applied to the test data in various computing environments. For example, in some example embodiments, the one or more models are executed on the device 4 of the user requesting the analysis results. In another example, the one or more models are executed on a device other than the device 4 of the user requesting the analysis results. In this way, test results can be analyzed without the additional step of downloading or transmitting the raw data to another device 4. Advantageously, at least some performance tests may be configured to output test results to a central repository, and analysis results can be generated automatically with the one or more models upon detection of new test results.

The template module 306 can store a plurality of test analysis templates for analysis of test results. Each test analysis template defines how a specific test type for a specific application or set of applications should be analyzed (i.e., which model(s) of the analysis modeler 318 should be applied). For example, each template can specify whether and which analysis of the application middleware, infrastructure resources (e.g., databases), and code level performance profiling is required, as well as defining any specific criteria (e.g., performance targets) to assess or compare test results with. In another example, performance targets can be measured relative to the history of all tests of a particular type of test on the particular application. For example, the template can, via the analysis parameters, specify that one or more of a capacity analysis, middleware analysis, database analysis, testing iteration performance, service requirements of the application, service requirements of a project associated with the application are required to be performed or satisfied pursuant to the template.

In at least some example embodiments, the test analysis templates are integrated with the application inventory 310, such that an update of the application inventory 310 automatically updates or adjusts the test analysis template. For example, where the test analysis template includes a parameter to analyze test results relative to historical averages, the test analysis template parameter can be automatically updated where the application inventory 310 receives new test results and defining a new historical average.

In some example embodiments, for example, the test analysis templates can define a test type (e.g., peak, soak, break, etc.), a test objective (e.g., often determined based on test type), metadata or tools for associating the analysis template with applications of the application inventory 310, and metadata associating the analysis template analysis with a session(s).

In embodiments where a new project is being tested (i.e., there are no stored test analysis templates), and application template may be created for each test type planned to be run on the application. In at least some example embodiments, the test analysis template for a new project can be a test analysis template for a similar project with revised parameters for the specific application. For example, where a new API feature is being implemented for a first application, a test analysis template of a previous API feature for a previous application can be imported into the project. In this way, potential advantages derived (e.g., certain tests are more indicative of performance upon deployment, certain tests detect issues faster, more accurately, certain models integrate with test results or third parties more effectively, etc.) from the previous feature can be imported into a new project without needing to access the testing data of the previous project.

In at least some example embodiments, the test analysis templates are related to one another, such that changes to a first test analysis template can trigger similar changes to related test analysis templates. For example, where different test analysis templates share a particular performance test, and changes are input into one test analysis template, the changes can be propagated to other test analysis templates having the same performance test.

In addition, once a test analysis template is configured for an application, it can be used for different analysis sessions corresponding to different stages of development of the application. Similarly, a test analysis template can be reused to test different environments.

The analysis module 216, with the retriever module 314, the integration module 316, and the template module 306, therefore facilitate integration, including automated integration, of a plurality of different testing types, from a plurality of different sources, and a centralized location irrespective of the disparate, asynchronous processes associated with application testing. Moreover, the templates stored within the template module 306 can provide an efficient, fast, and consistent means for evaluating application testing. For example, test planning personnel may have input into a testing template, as can test execution personnel. Moreover, testing templates facilitate the exchange of knowledge derived from previous tests, and the organizational consistency embodied by the testing templates facilitate leveraging existing test analyses into application testing of related applications lacking a template. For example, a testing template may be refined during the course of testing a first application, and the testing template may be transferred to the testing of another application, or another build of the first application, without disclosing any sensitive information underlying the initial developing of the testing template, or requiring the voluminous or unwieldy data used to learn from the first testing template.

Figure 4A:
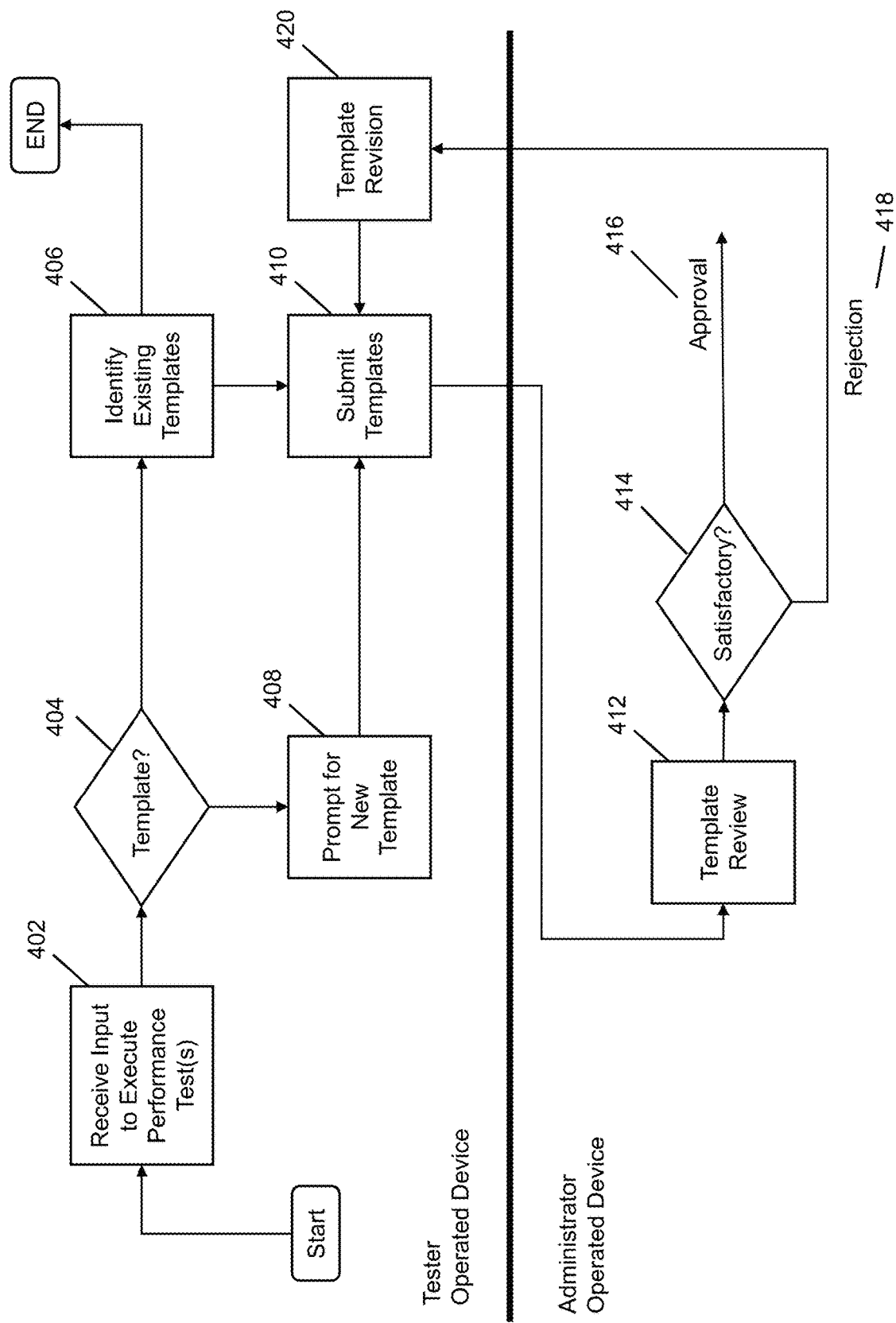
FIGS. 4A and 4B are each a flow diagram of an example of computer executable instructions for analysis of executed performance testing.

Referring now to FIG. 4A, a flow diagram of an example of computer executable instructions for determining or generating test analysis templates is shown. In FIG. 4A, it is contemplated, and shown, that two separate users (e.g., different users, each with a different device 4) are responsible for determining test analysis templates: an administrator operated device (bottom of the figure), and a tester operated device (top of the figure). The delineation between user actions is illustrative only and is not intended to be limiting.

At block 402, an input associated with executing a performance test of an application is received. For example, the tester operated device may enter input into an application (e.g., a dashboard GUI for automated testing and automated testing analysis) to execute a performance test. In example embodiments, the input may be from a micro-service which monitors application development milestones which is coupled to the enterprise system 6 to automate testing.

At block 404, a test analysis template is selected. In embodiments where a testing template user interface is generated (e.g., FIG. 5), the interface can include a listing of available test analysis templates (e.g., list 502 in FIG. 5), and provide for the selection of the tool to create new test analysis templates (e.g., button 504 in FIG. 5).

At block 406, where the input is indicative of an existing testing template (e.g., a verified existing template previously used to test the application is selected from the list), the performance test may be executed, and the test results may thereafter be analyzed.

Figure 6:
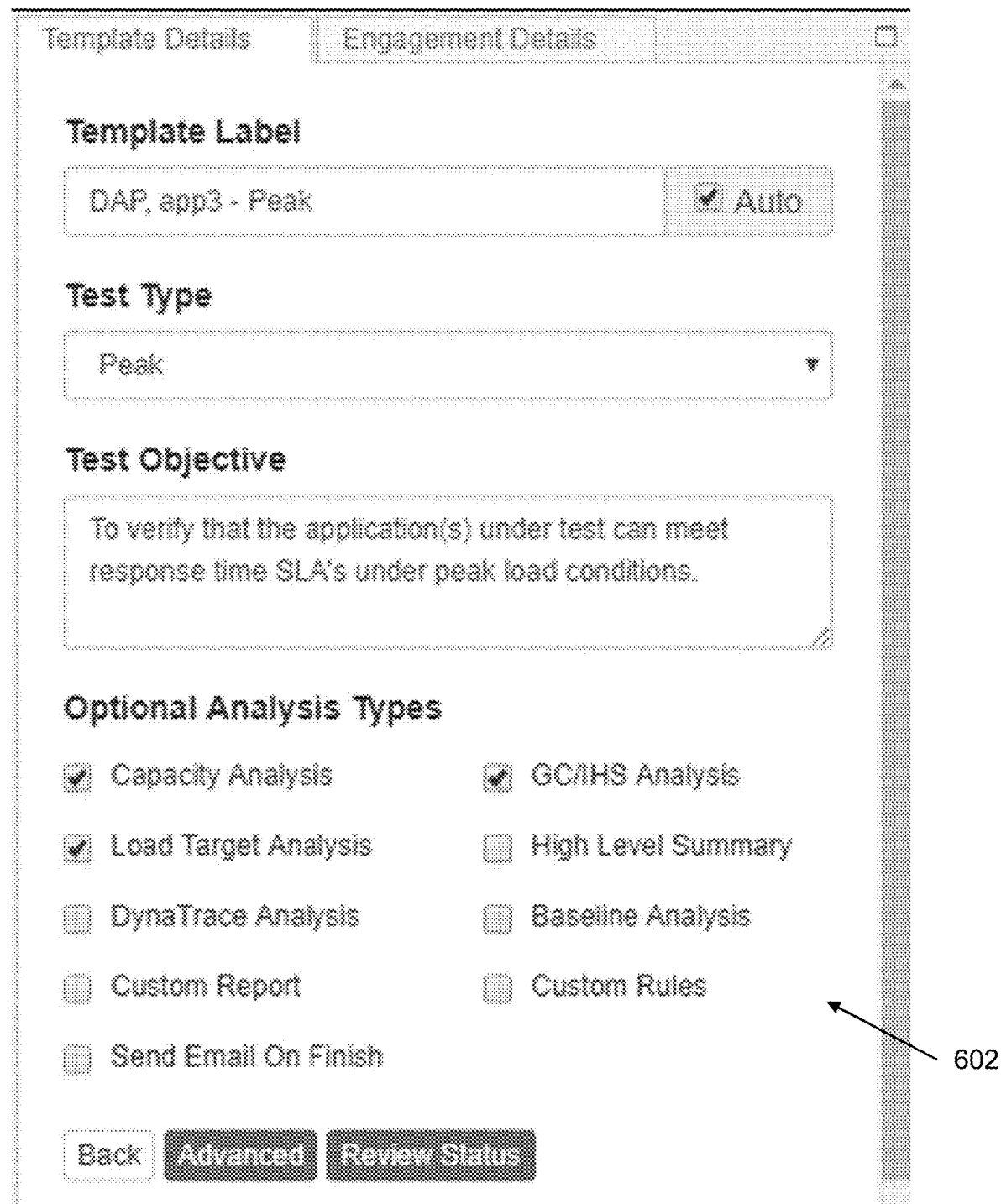
FIG. 6 is an image of an example component test analysis template graphical user interface.

At block 408, where the input is not indicative of an existing testing template (e.g., the tool to create new testing completes is selected), a prompt or other mechanism to create a new template can be generated, such as the GUI shown in FIG. 6. In example embodiments, the GUI can include one or more components to standardize and simplify the process of generating a test analysis template. For example, the prompt can include a checklist allowing selection of one or more features of the testing template (e.g., checklist 602 in FIG. 6) and various other fields for customizing the template. The checklist may allow configuration of the template based on an expected type of performance test, based on an expected recipient list, etc. In example embodiments, the prompt may show existing testing templates from similar applications.

At block 410, the generated template can be submitted to an administrator operated device for review and approval. In at least some example embodiments, all templates, including existing templates in block 406, are required to be submitted again for approval prior to their use.

At block 412, the template is reviewed by the administrator operated device. The review can include, for example, a review of whether the template should include an analysis of the application middleware, and which performance targets are appropriate for the test being proposed.

At block 414, the administrator operated device either approves or rejects the submitted template.

If approved, the template is transmitted pursuant to block 416 to evaluate performance testing.

If the template is rejected, pursuant to block 418, the template may be sent back to the tester operated device for template revision at block 420.

Figure 4B:
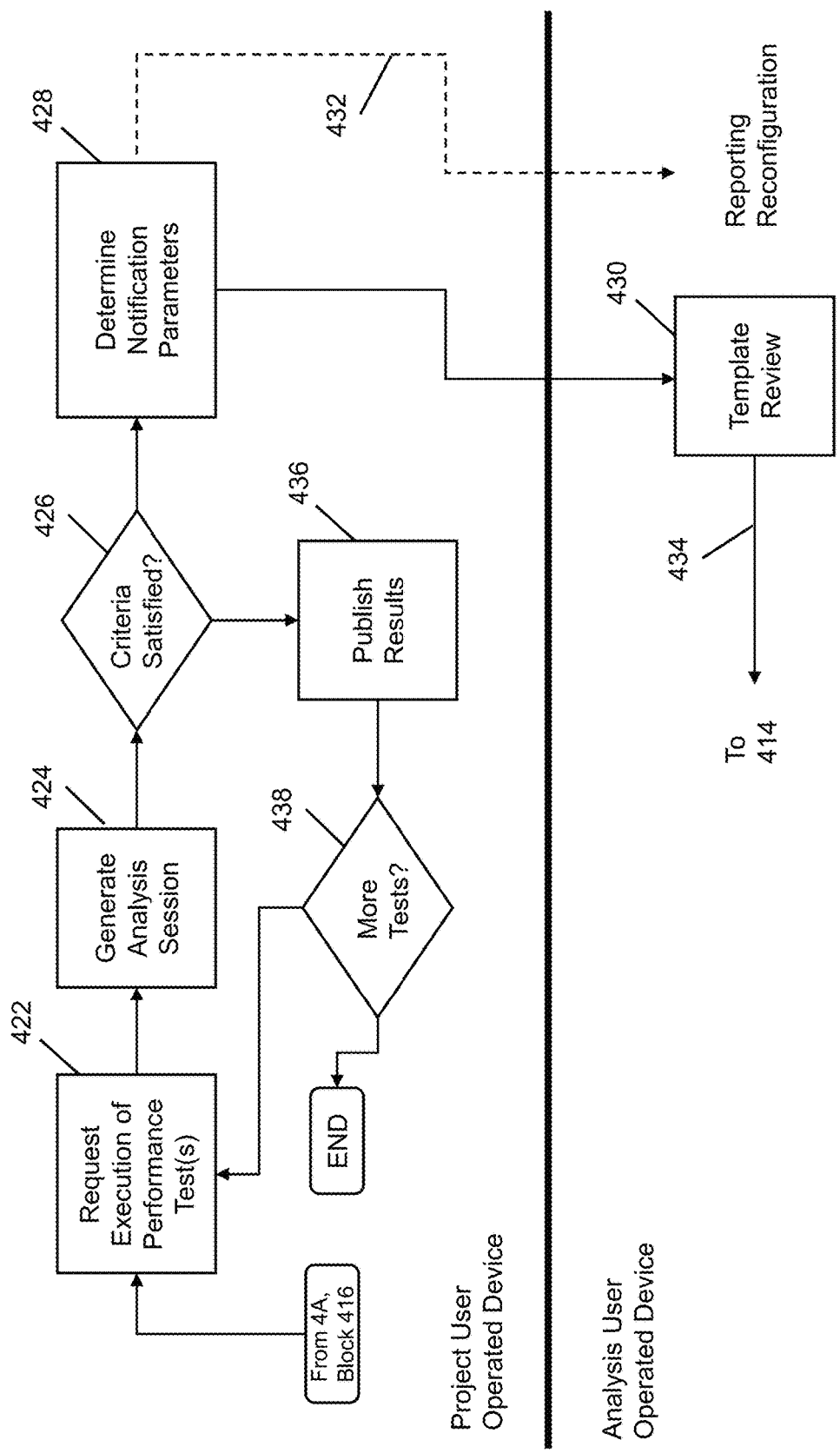

Referring now to FIG. 4B, a flow diagram of an example of computer executable instructions for analyzing executed performance tests is shown. As with FIG. 4A, it is contemplated, and shown in FIG. 4B, that two separate users (e.g., users of different devices 4) can interact with the process for analyzing performance test results: an administrator operated device (bottom of the figure), and a tester operated device (top of the figure). The delineation between user actions is illustrative only and is not intended to be limiting. Furthermore, it is understood that the entire process may be automated based on preconfigured parameters, without input from user devices 4.

At block 422, a request is sent to perform the performance test. In example embodiments, the performance tests may be conducted within the enterprise system 6, or the performance tests may be conducted on the computing resources 8, or some combination thereof.

At block 424, an analysis session for analyzing the results of a performance test being executed is created. Where input is for executing more than one performance test, separate analysis sessions for each executed performance test can be created simultaneously, or in sequence as each performance test is executed. The analysis session can be preconfigured or be able to receive output in a form output by the test engine performing the performance test. For example, the performance test may be a third party garbage collection analysis program, and the analysis session can be chosen for its ability to integrate with the aforementioned program to receive the output without corrupting same.

Access to each analysis session can be controlled, or otherwise configured for ease of use. For example, an analysis session can be associated with the test results it interprets, allowing rapid review of the underlying test results from tests performed pursuant to the analysis session. Access to the analysis session can be controlled by only allowing access to designated user accounts, to encourage compartmentalization within the template framework and to avoid inadvertent disclosure.

Also at block 424, analysis results are generated based on a test analysis template and the test results (e.g., gathered by the retriever module 314, or otherwise).

At block 426, the analysis results are compared to one or more analysis parameters to determine whether the test was successful.

In at least some example embodiments, the analysis parameters are used to determine whether the analysis provides meaningful results. For example, where the analysis results indicate that the performance testing failed to properly initialize, analysis parameters which quantify invalid entries in the test results can be used to determine problems associated with the performance testing framework, not the application under test.

Some example embodiments, for example, include analysis parameters as discussed in relation to the application inventory 310 and performance expectations. Where the analysis results comply with the performance-based analysis parameters, the analysis results may be consumed by one or both of block 428 and block 436.

At block 428, the analysis results can be processed by the reporting module 302, to facilitate transmission to one or more analysis user operated devices. For example, in a continual review cycle, analysis users may wish to periodically review or be notified of successful testing to application testing schedules are being met. In some embodiments, for example, the template is also continually reviewed upon the completion of analysis results to ensure correct operation or to determine improvements. This is shown by block 430, analogous to block 412, where additional template review is undertaken.

At block 432, the analysis results may trigger a reconfiguration or specific triggering of certain reporting parameters. For example, upon completion of some scheduled testing, interim reports may be generated and provided only to a limited member of reviewers. In contrast, upon completion of all schedule testing, different notification parameters may be employed to notify higher levels of review.

At block 434, based on the analysis results, the analysis user may request to modify the test analysis template and have the proposed modifications reviewed pursuant to block 414 (e.g., by a different user, or the same user may be required to certify that the changes comply with existing template criteria, etc.).

The block 436, the analysis results are published for all project user operated devices. In this way, project users may be able to access analysis results immediately upon their satisfaction of certain criteria.

At block 438, it is determined whether additional performance testing is scheduled for the application in issue. In the event that additional performance testing is scheduled, additional analysis testing can be performed as described herein.

Figure 7:
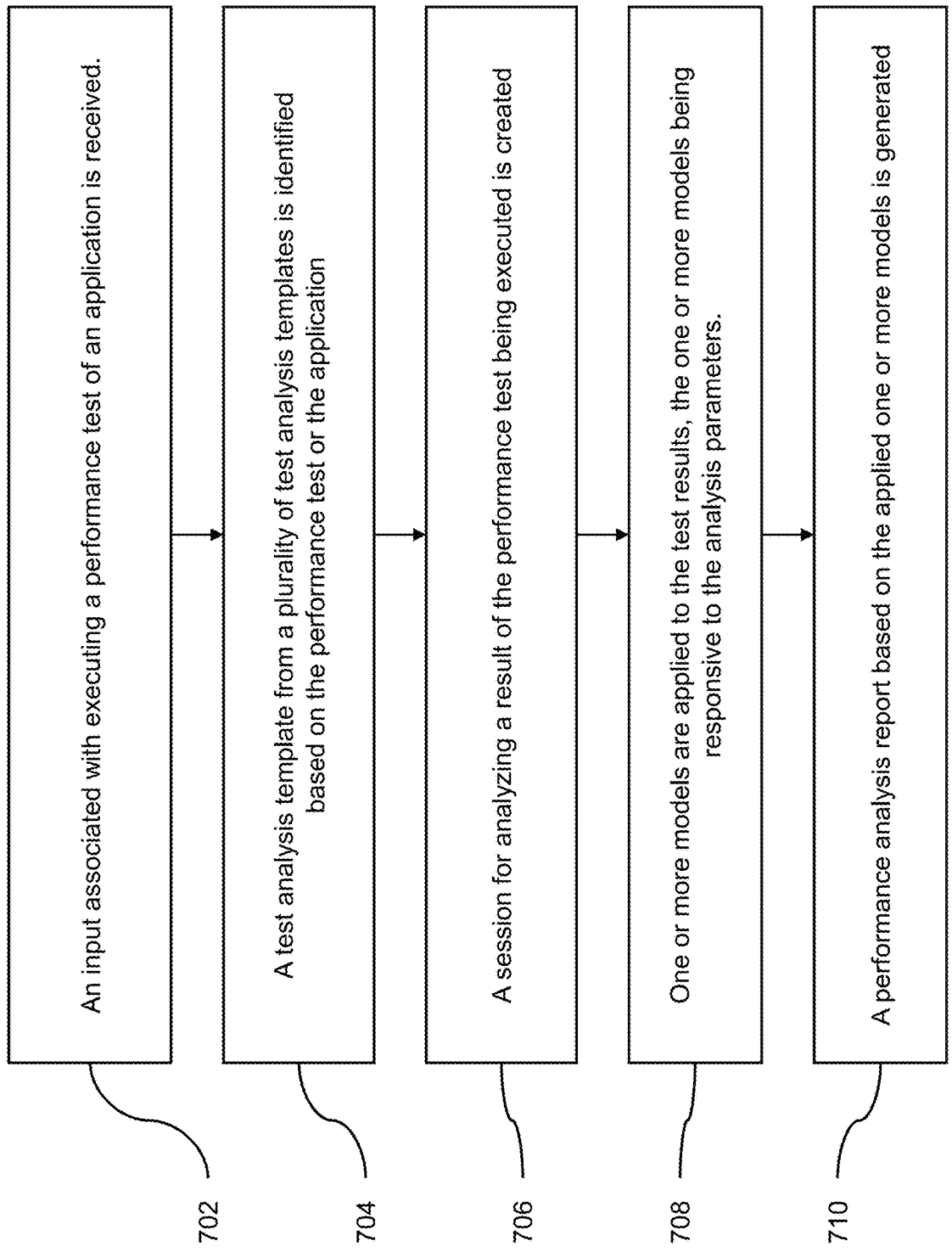
FIG. 7 is a flow diagram of another example of computer executable instructions for analysis of executed performance testing.

Referring now to FIG. 7, a flow diagram of yet another example of computer executable instructions for analysis of executed performance testing is shown.

At block 702, an input associated with executing a performance test on an application is received.

At block 704, a test analysis template is identified from a plurality of test analysis templates. The test analysis template is identified based on the performance test or the application. Each test analysis template defines analysis parameters for interpreting results of executed performance tests (e.g., as defined in application inventory 310).

At block 706 a session for analyzing a result of the performance test being executed is created.

At block 708, one or more models are applied to the test results, the one or more models being responsive to the analysis parameters.

At block 710, a performance analysis report based on the applied one or more models is generated.

Referring again to FIG. 2, the visualization module 218 can consume analysis results from the analysis module 216 to generate one or more visualizations. In example embodiments, the visualization module 218 generates a dashboard allowing for review of analysis results, test results, and simulation results associated with one or more applications and project engagements. It is noted that the visualization module 218, although shown as separate from analysis module 216, can be incorporated within the analysis module 216 (e.g., as shown in FIG. 3).

One example of a visualization that can be generated by the visualization module 218 (e.g., based on information retrieved from the reporting module 302, or otherwise) is the interim report shown in FIG. 8.

The shown automatically generated email includes attachments to the raw data of different types of test results, the first being a general report titled interim performance results, the second attachment being a report for a specific test result (e.g., the test results measuring the capacity, used during the performance test, of limited testing infrastructure), and a report, in a different format, of the garbage collection analysis discussing the performance of memory usage by the application during testing.

The shown email also includes various summary provisions as defined by the test analysis template, including a focused summary (e.g., the test outcome and next steps portion), a high-level review of the performance achieved (e.g., the objective, the test types, response time, etc.).

In example embodiments, the interim report can be an email report for a simulation, which tests the application in a simplified environment.

FIGS. 9-19 are each an image of various aspects of a visualization associated with analysis results and will be discussed below.

Figure 9:
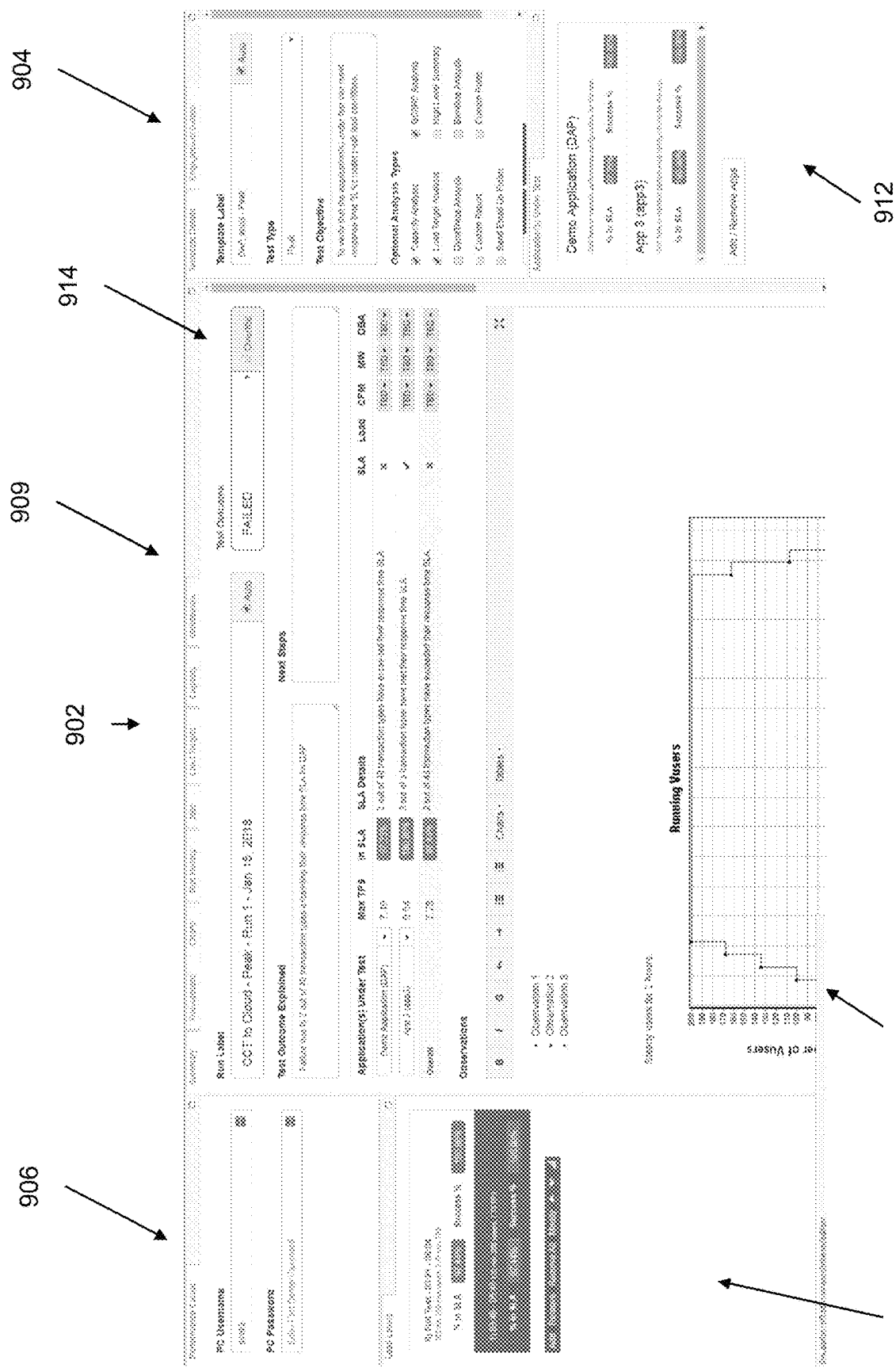
Figure 10:
Figure 11:
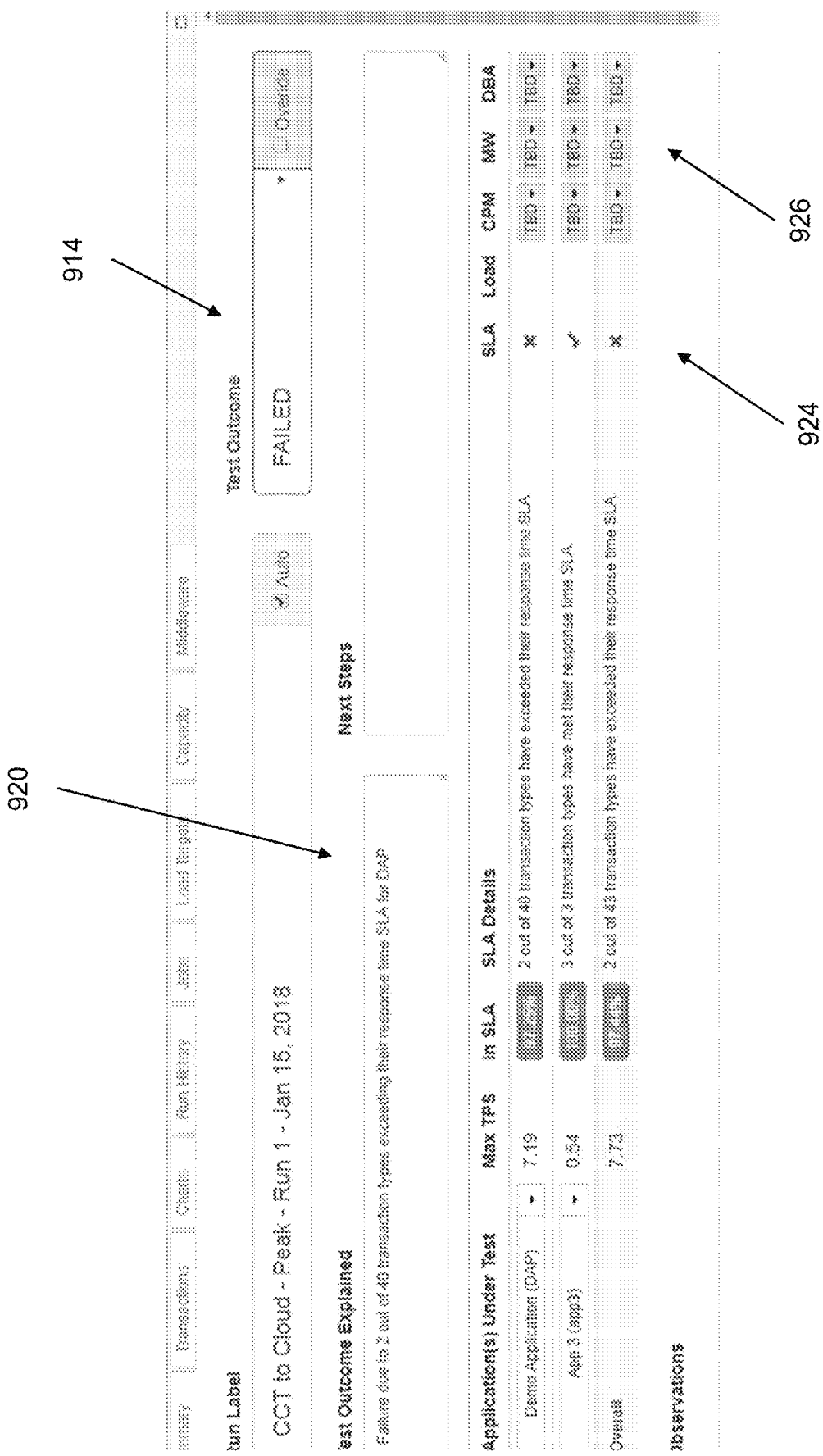

FIG. 9 shows a dashboard 902 for visualizing analysis results. The dashboard 902 can include various panels, such as the shown panels 904, 906, 908, 910, and 912. The relative positioning of the various panels can be configured by a user of the dashboard 902. In example embodiments, configurations of the dashboard 902 are saved for the specific application under test.

Panel 904 is shown as a dashboard allowing interaction with the manipulation of the template module 306. In this dashboard, template may be updated, reviewed, and so forth. In at least some example embodiments, the panel 904 can be a replication of the GUI shown in FIG. 6.

Panel 906 can allow for selection and review of the user account used to review the dashboard 906. For example, users having multiple user account types may be able to switch between account types to view different analysis results. Continuing the example, a user occupying a test planning role for a first project may occupy a test execution role for a second project, and toggle between the two projects with panel 906.

Panel 908 can include a snapshot of a particular performance test type executed on the application. As shown in greater detail in FIG. 10, the panel 908 can include a listing of the types of load level tests executed, and their performance. Panel Panel 909, shown in greater detail in FIG. 11, can include a snapshot of the analysis results. Visual element 914 can show whether the test results failed the required parameters or criteria. The panel 909 can include further particulars of the tests run on the application, including a review element 920 that shows a summary of the reasons the test passed or failed, criteria level visualizations in visual element 924 (e.g., a checkbox that indicates that the test denoted by the row satisfied a service level agreement), and whether certain types of tests were conducted, as shown by visual element 926.

Panel 910 can include one or more graphical representations of the analysis results.

Figure 12:
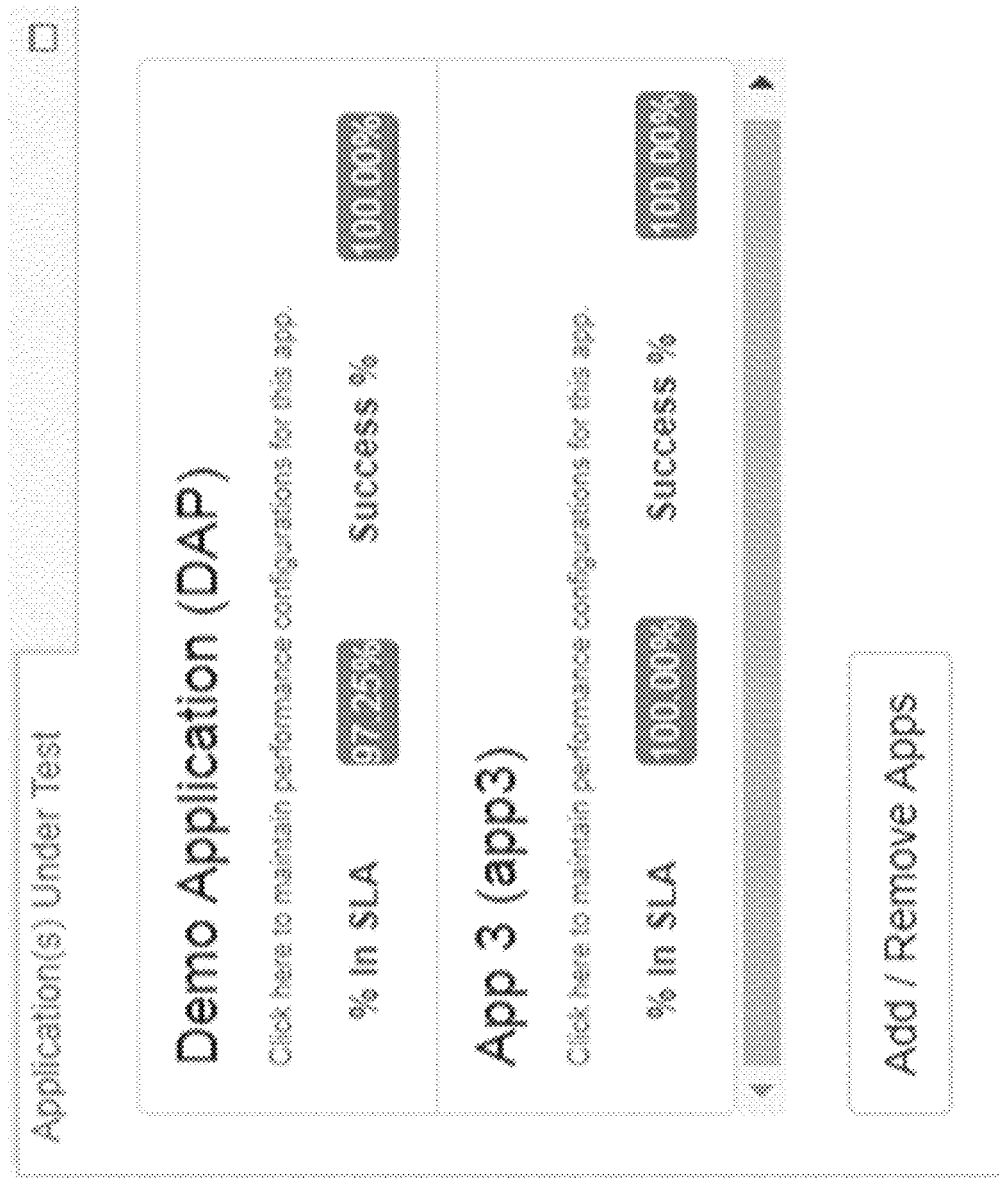

Panel 912, shown in greater detail in FIG. 12, can include visual elements to facilitate comparison of the analysis results of different builds of the application.

Figure 14:
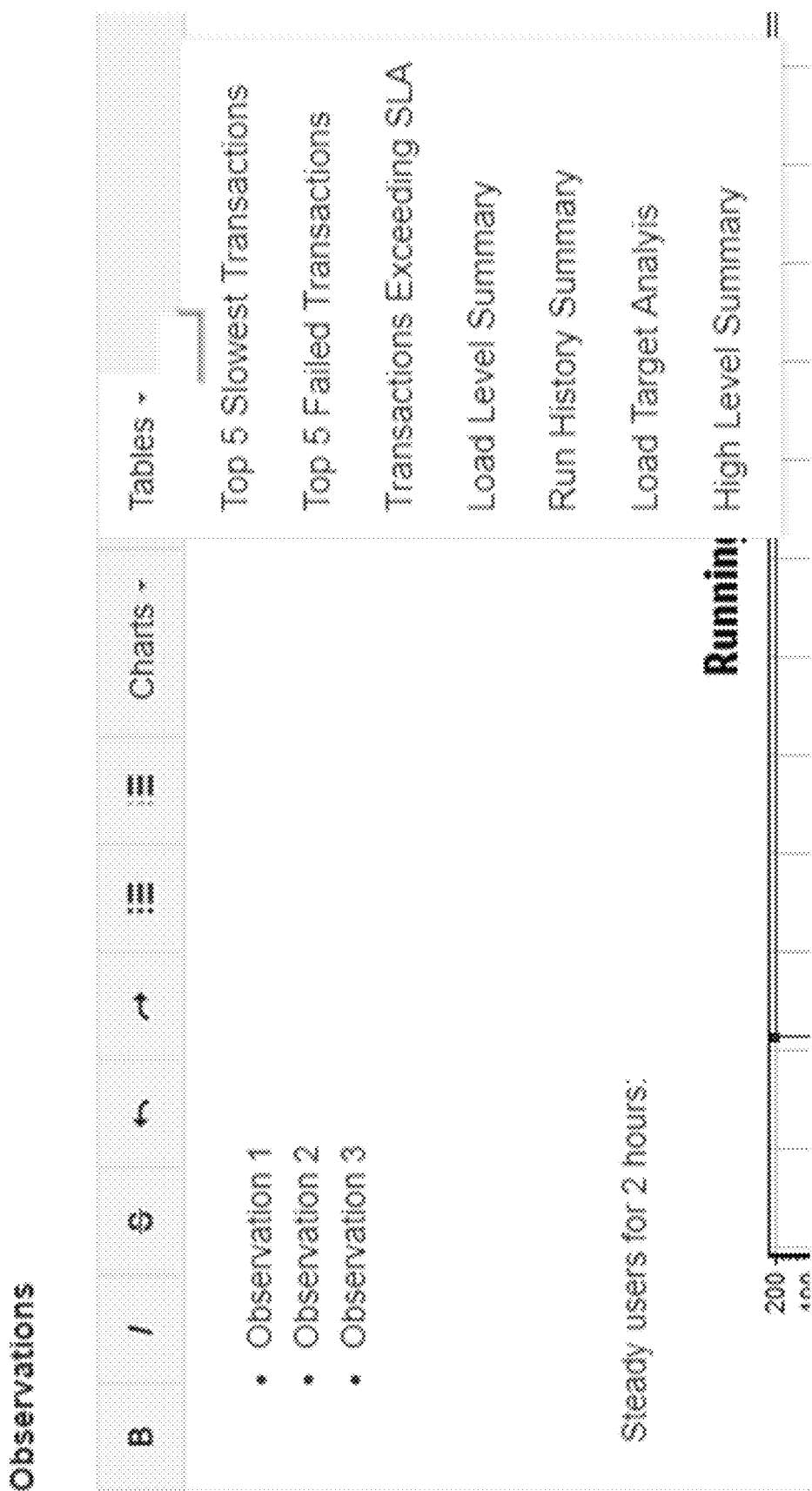

FIGS. 13 and 14 show examples of input elements wherein the user may be capable of generating desired graphical elements or table elements, including various filtering mechanisms.

Figure 15A:
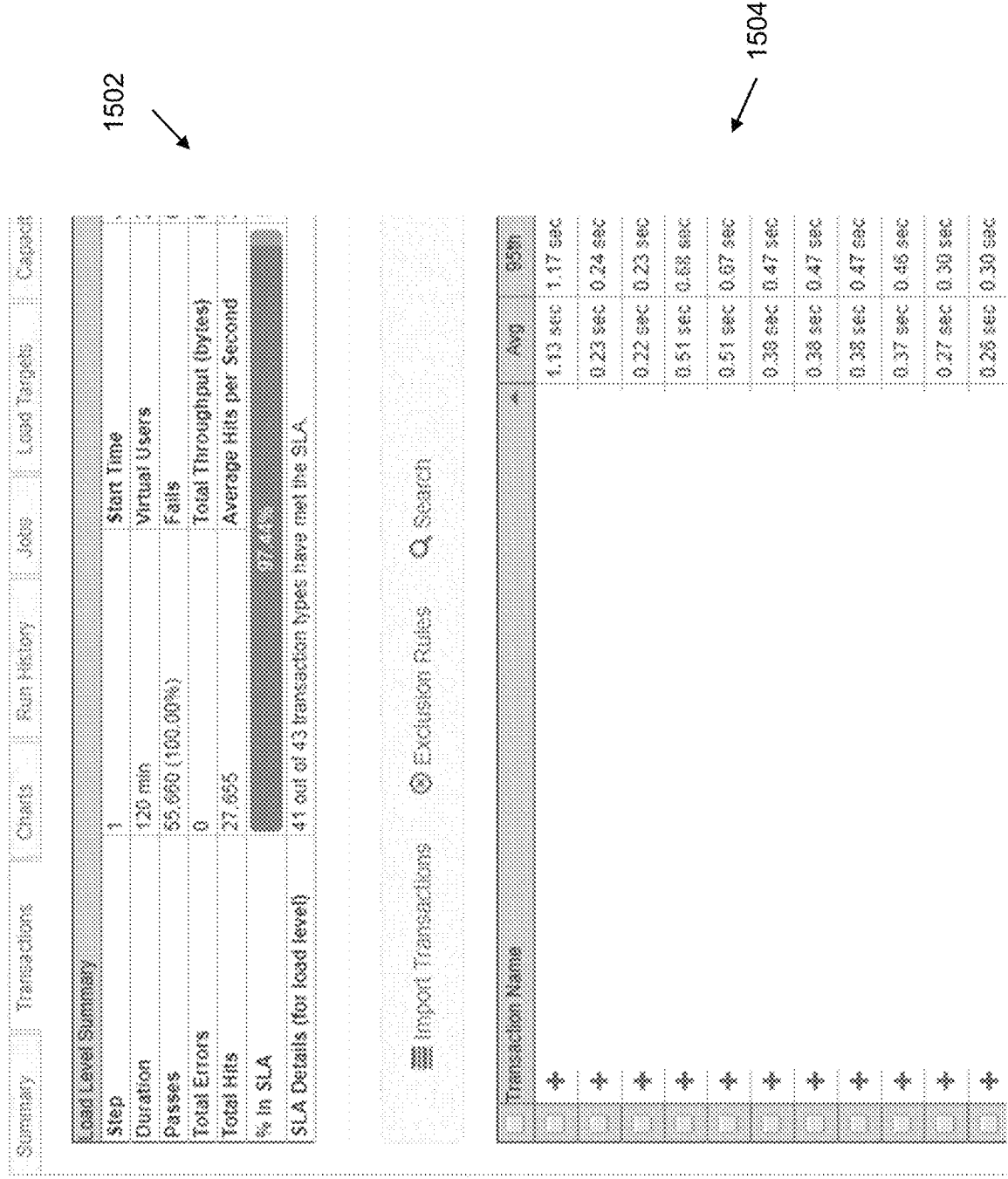

The dashboard 902 can allow for a "drill down" analysis into the analysis results. FIGS. 15A (a right side of an example GUI) and 15B (the left side of an example GUI) together show an example embodiment where the dashboard 902 includes additional panels 1502 and 1504 for reviewing the particulars of the analysis results and the test results, respectively.

Figure 16:
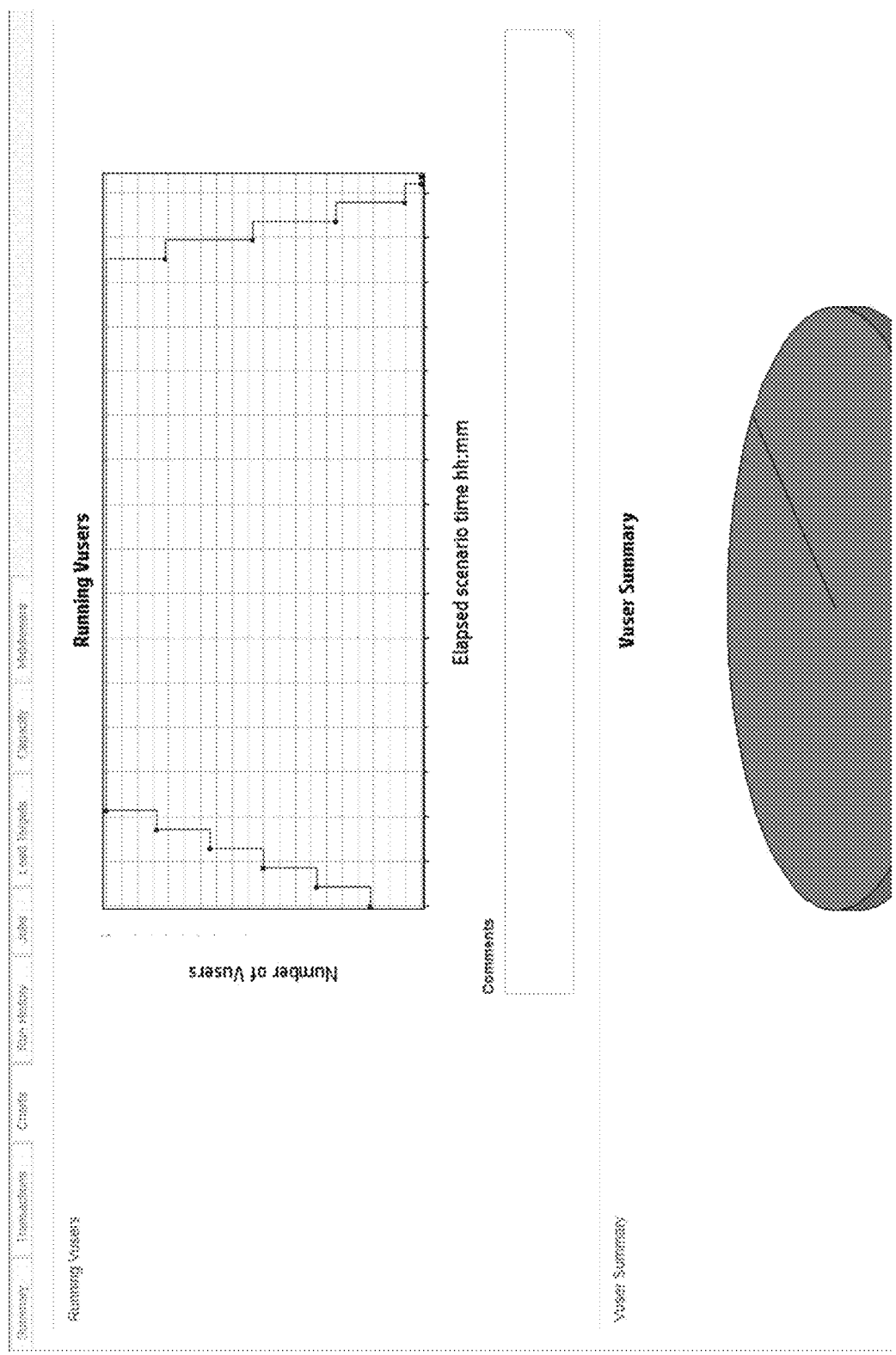
Figure 18:
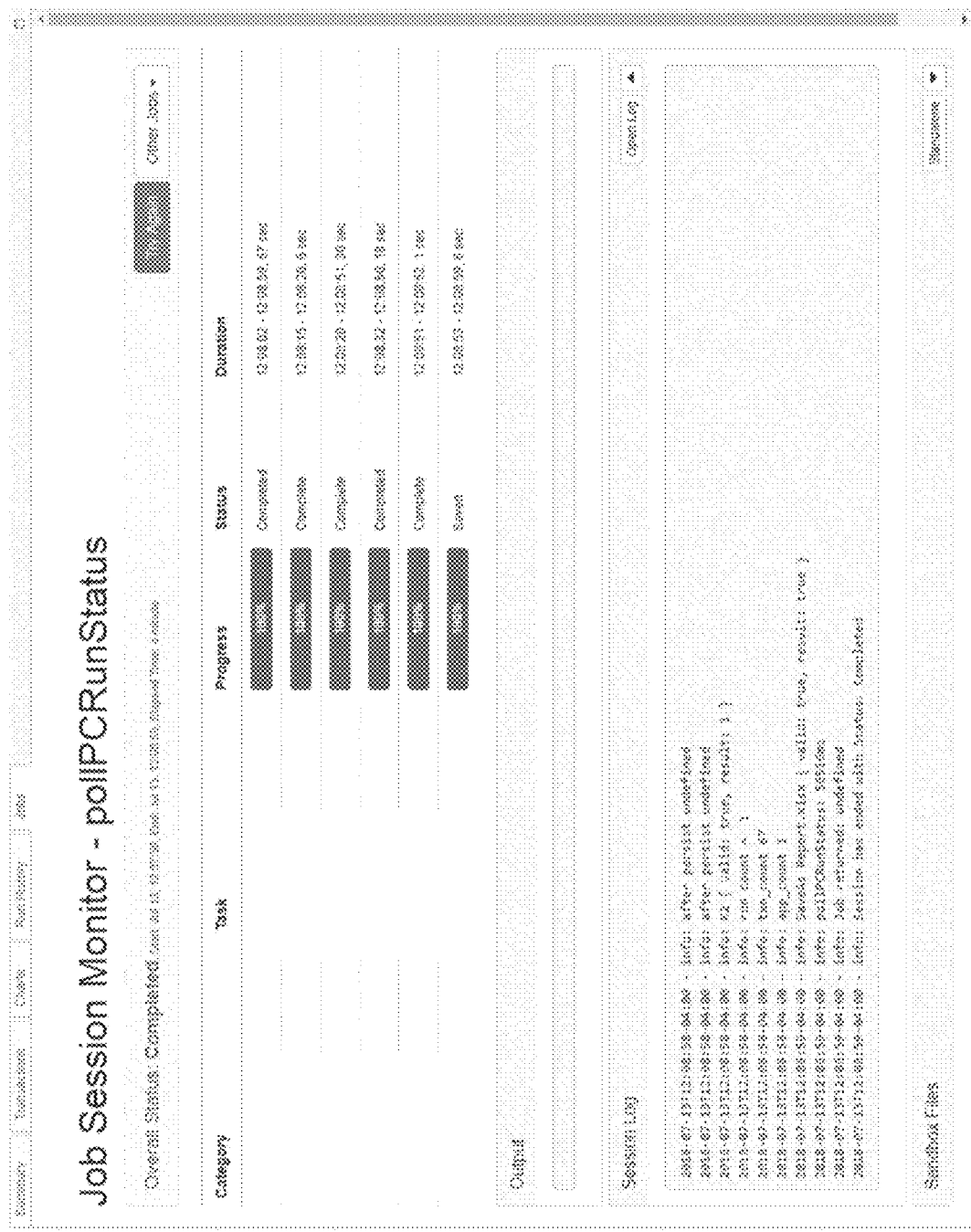

Similarly, dashboard 902 can allow for a "drill down" analysis by way of visual representations such as charts and graphs, as shown in FIG. 16.

Figures 17A, 17B:
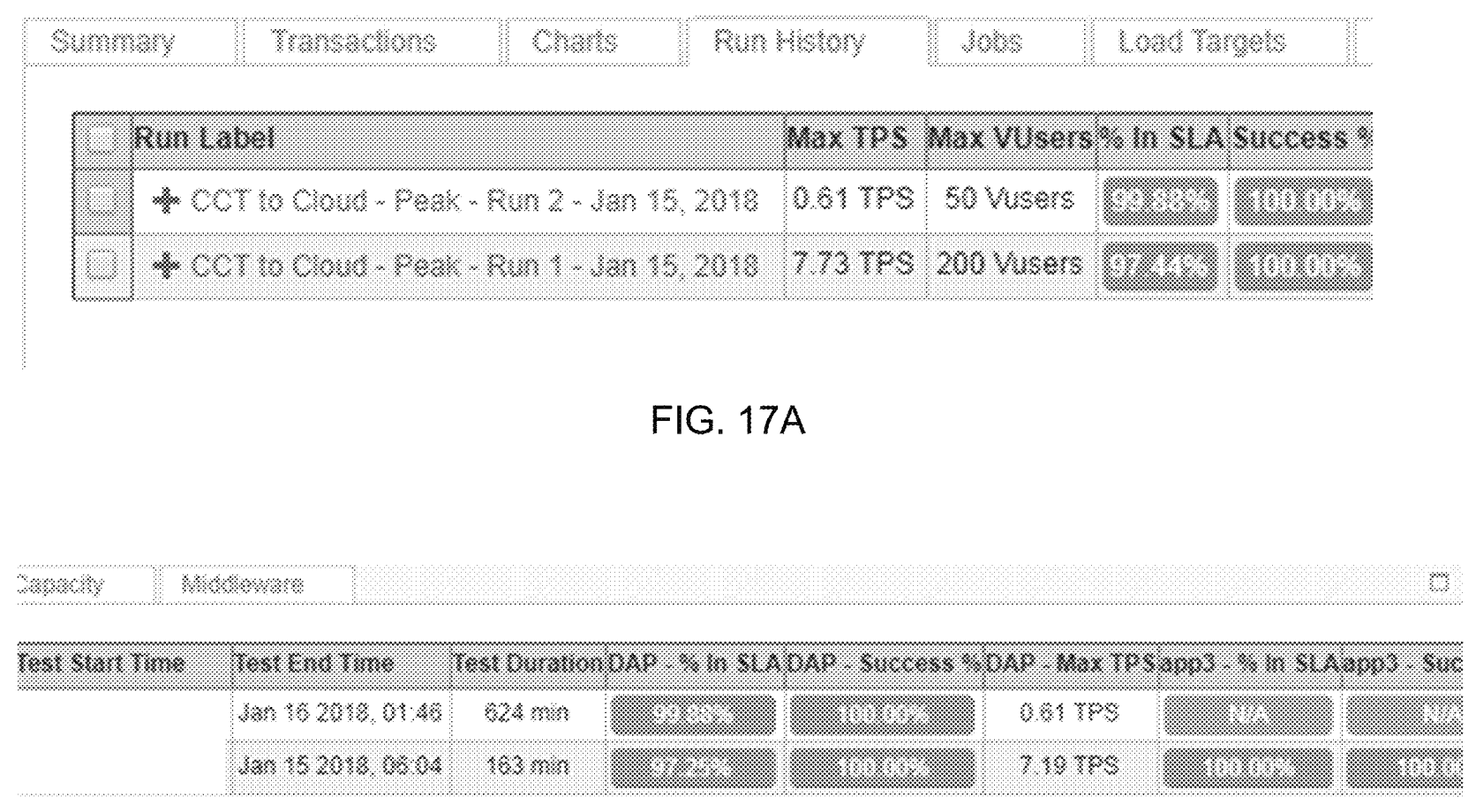
Figure 19:
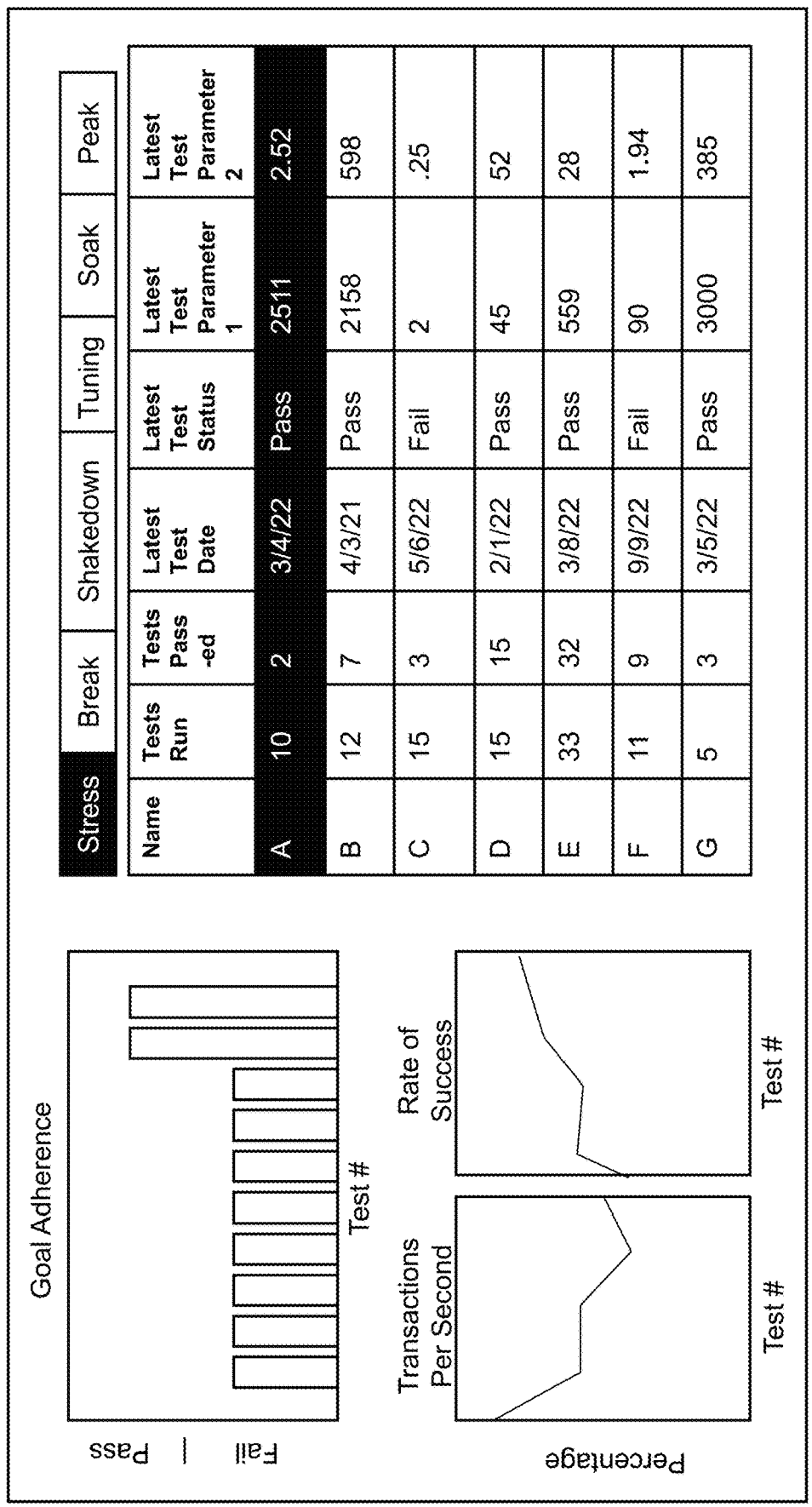

The dashboard 902 can include a GUI for aggregating the performance analysis report with reports from previous sessions associated with the application, or an associated project (e.g., FIG. 17A, showing a left side of an example GUI, and FIG. 17B showing a related right side of an example GUI, where results of multiple tests are shown), for reviewing the remaining jobs to complete application testing (FIG. 18), and for viewing the test results in the analysis results of multiple applications quickly (FIG. 19).

Although not shown, it is understood that dashboard 902 can also include a GUI for modifying the contents of an interim report, such as the interim report generated in FIG. 7. In at least some example embodiments, the functionality of the interim report GUI is hosted in implemented by the analysis module 216.

Referring again to FIG. 2, the improvement module 220 can be used to provide feedback and adjust the processes of generating analysis results. For example, actual results from real world usage of applications can be leveraged to adjust the application parameterization block 208, such that more meaningful performance criteria are developed. Similarly, actual results from real world usage of applications can be used to tweak simulations generated pursuant to block 212, or to adjust test analysis templates stored in the analysis module 216, or to adjust the contents of the application inventory 310, etc.

Figure 20:
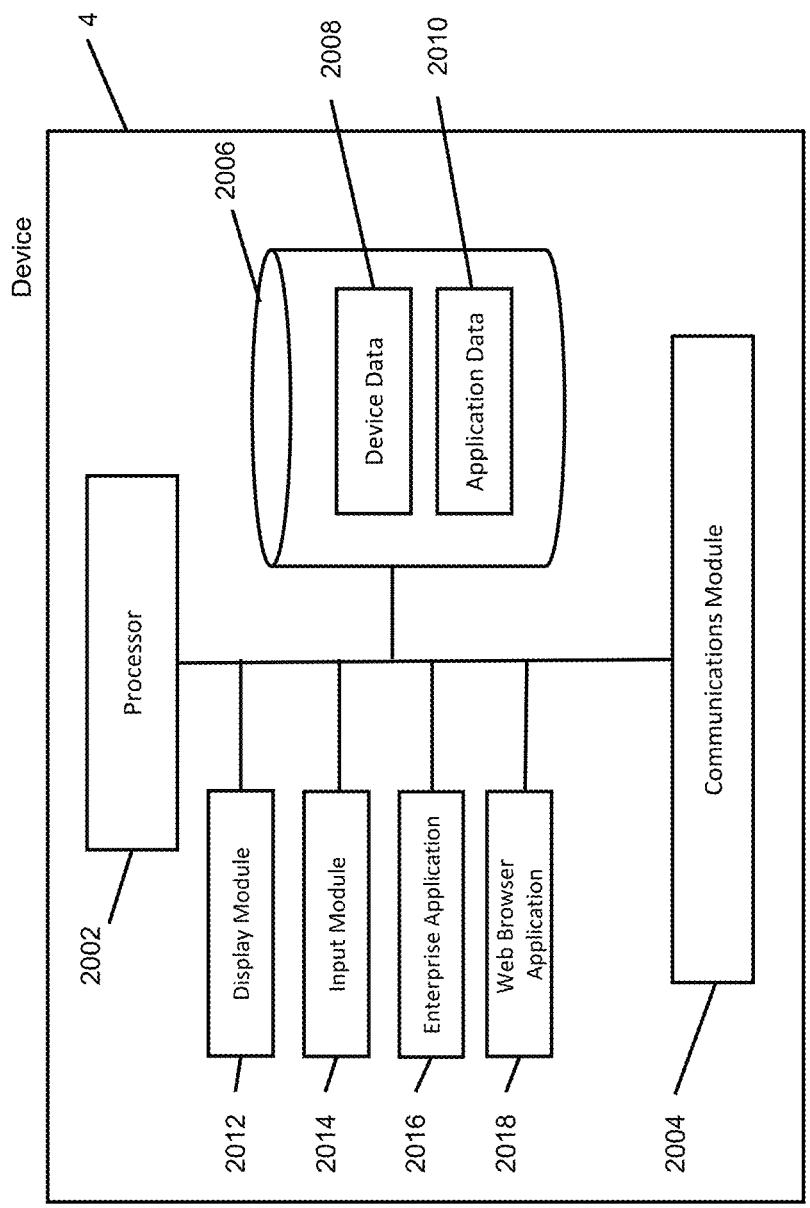
FIG. 20 is a block diagram of an example client device.

In FIG. 20, an example configuration of the device 4 is shown. In certain embodiments, the device 4 may include one or more processors 2002, a communications module 2004, and a data store 2006 storing device data 2008 and application data 2010. Communications module 2004 enables the device 4 to communicate with one or more other components of the computing environment 2, as the enterprise system 6, via a bus or other communication network, such as the communication network 10. While not delineated in FIG. 20, the device 4 includes at least one memory or memory device that can include a tangible and non-transitory computer-readable medium having stored therein computer programs, sets of instructions, code, or data to be executed by processor 2002. FIG. 20 illustrates examples of modules and applications stored in memory on the device 4 and operated by the processor 2002. It can be appreciated that any of the modules and applications shown in FIG. 20 may also be hosted externally and be available to the device 4, e.g., via the communications module 2004.

In the example embodiment shown in FIG. 20, the device 4 includes a display module 2012 for rendering GUIs and other visual outputs on a display device such as a display screen, and an input module 2014 for processing user or other inputs received at the device 4, e.g., via a touchscreen, input button, transceiver, microphone, keyboard, etc. The device 4 may also include an enterprise application 2016 provided by the enterprise system 6, e.g., for accessing data stored within the enterprise system 6, for the purposes of authenticating to gain access to the enterprise system 6, etc. The device 4 in this example embodiment also includes a web browser application 2018 for accessing Internet-based content, e.g., via a mobile or traditional website. The data store 2006 may be used to store device data 2008, such as, but not limited to, an IP address or a MAC address that uniquely identifies device 4 within enterprise system 6. The data store 2006 may also be used to store application data 2010, such as, but not limited to, login credentials, user preferences, cryptographic data (e.g., cryptographic keys), etc., or data related to application testing.

Figure 21:
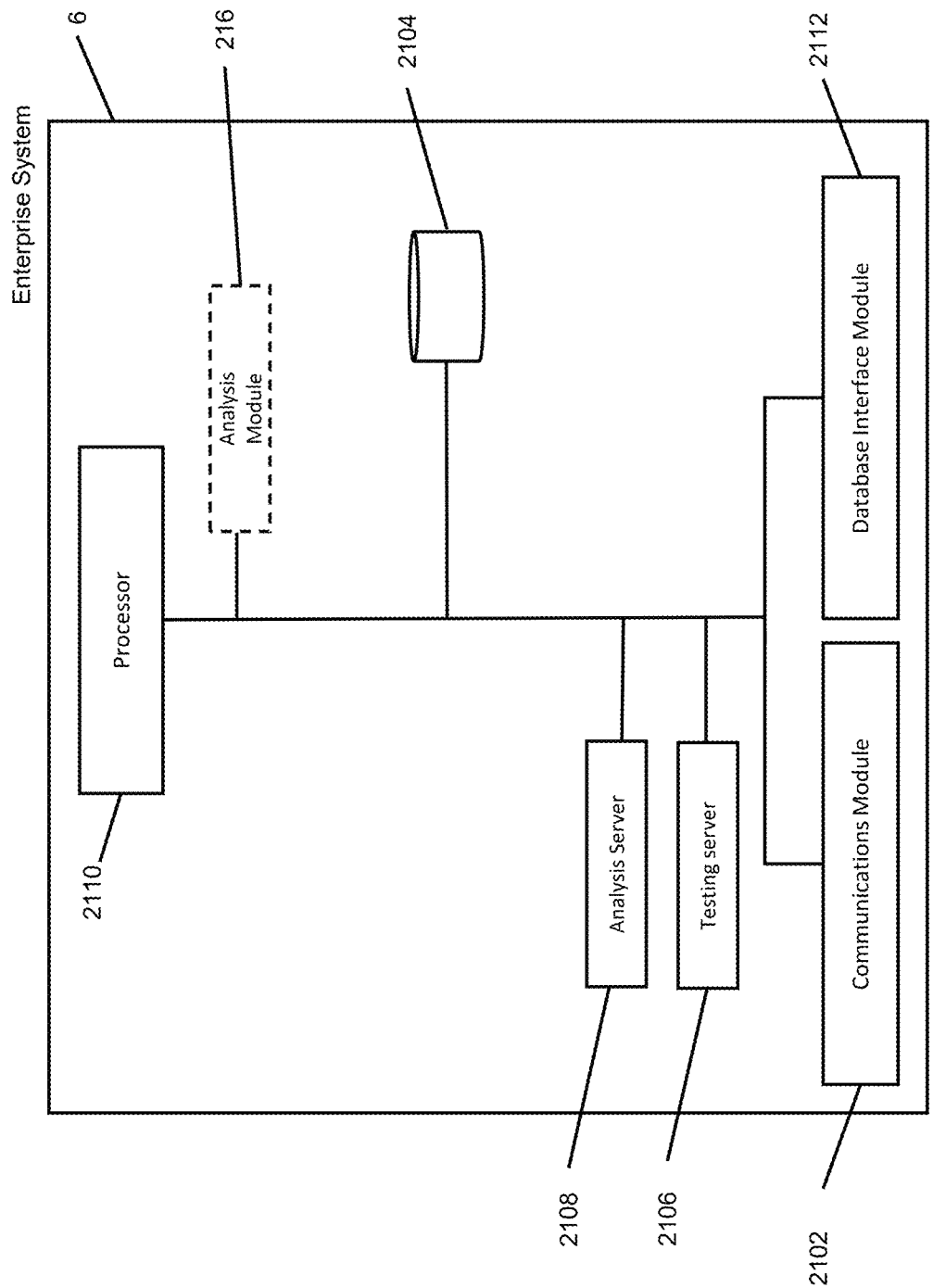
FIG. 21 is a block diagram of an example configuration of a server device for automating analysis of executed performance testing.

In FIG. 21, an example configuration of an enterprise system 6 is shown. The enterprise system 6 includes may include one or more processors 2110, a communications module 2102 that enables the enterprise system 6 to communicate with one or more other components of the computing environment 2, such as the device 4, via a bus or other communication network, such as the communication network 10. While not delineated in FIG. 21, the enterprise system 6 includes at least one memory or memory device that can include a tangible and non-transitory computer-readable medium having stored therein computer programs, sets of instructions, code, or data to be executed by one or more processors (not shown for clarity of illustration). FIG. 21 illustrates examples of servers and datastores/databases operable within the enterprise system 6. It can be appreciated that servers shown in FIG. 21 can correspond to an actual device or represent a simulation of such a server device. It can be appreciated that any of the components shown in FIG. 21 may also be hosted externally and be available to the enterprise system 6, e.g., via the communications module 2102. In the example embodiment shown in FIG. 21, the enterprise system 6 includes one or more servers to provide access to data 2104, e.g., for testing analysis or testing implementation purposes. Exemplary servers include a testing server 2106, an analysis server 2108 (e.g., hosting analysis module 216). Although not shown in FIG. 21, as noted above, the enterprise system 6 may also include a cryptographic server for performing cryptographic operations and providing cryptographic services. The cryptographic server can also be configured to communicate and operate with a cryptographic infrastructure. The enterprise system 6 may also include one or more data storage elements for storing and providing data for use in such services, such as data storage 2104.

The data storage 2104 can include, in an example embodiment, any data stored in database 304, or data about accounts of a testing system, etc.

The enterprise system 6 can include a database interface module 2112 for communicating with databases for the purposes of analyzing test results.

It will be appreciated that only certain modules, applications, tools and engines are shown in FIGS. 1-3, 20, and 21 for ease of illustration and various other components would be provided and utilized by the enterprise system 6, or device 4, as is known in the art.

Figure 22:
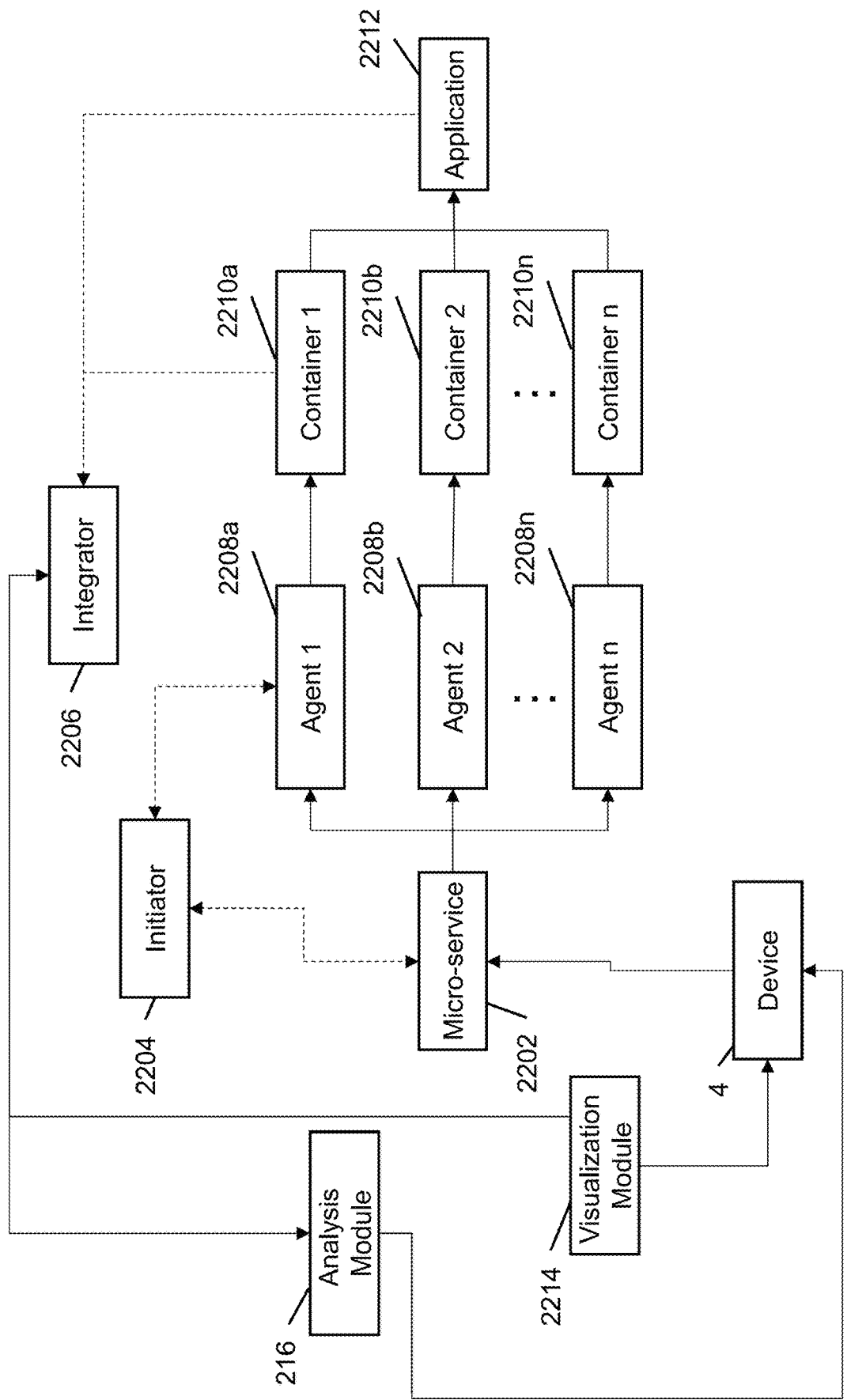
FIG. 22 is a schematic diagram of an example framework for automated testing.

Referring now to FIG. 22, a schematic diagram of an example framework for automated testing is shown.

As shown in FIG. 22, a micro-service 2202 can receive a request to initiate testing from the device 4. In example embodiments, the micro-service 2202 monitors the device 4 to determine whether to begin testing (e.g., the micro-service 2202 integrates with a scheduling application on the device 4).

In response to receiving the request, the micro-service 2202 can initiate one or more agents 2208 (shown as including a plurality of agents 2208a, 2208b . . . 2208n) to implement the requested testing. Each agent 2208 can, in at least some example embodiments, initiate or schedule a container 2210 (shown as containers 2210a, 2210b . . . 2210n, corresponding to the agents 2208) to implement the testing. The container 2210 can be, for example, a computing environment with certain hardware of computing resources 8 dedicated to implement the testing. In addition to the necessary physical resources, the container 2210 can have loaded thereon additional data required to implement test. For example, the container 2210 can be loaded with simulations of mobile devices to interact with the application under test 2212. In another example, the container 2210 can be loaded with simulated or real transactional data to determine how the application under test 2212 will interact with same.

In at least some contemplated embodiments, the micro-service 2202 initiates multiple agents 2208 to run testing in parallel. For example, the micro-service 2202 can initiate different agents 2208 to run a separate test on simulations of different popular cellphones (e.g., test simulations of Android™ and iOS™ phones in parallel). In another example, the micro-service 2202 can initiate a different agent 2208 to run different tests in parallel (e.g., one agent 2208 is initiated to run a soak test, another is initiated to run a peak test, etc.).

The micro-service 2202 can initiate an agent 2208 via an initiator 2204. For example, certain architectures can require a separate initiator 2204 to initiate agents 2208 for security purposes, where the micro-service 2202 must authenticate or otherwise satisfy security credentials of the initiator 2204. In another example embodiments, the initiator 2204 may be mandated by a third party (e.g., the computing resources 8) whose resources are used to implement the testing.

Each container 2210 can thereafter be used to test the application 2212. In example embodiments, each container tests different instances of the application 2122, to enable the aforementioned parallel testing.

A visualization module 2214 enables the device 4 to view information about the testing. For example, the visualization module 2214 can be in communication with the micro-service 2202 to see which tests have been initiated by the micro-service 2202, and information related thereto (e.g., test x has been received by the micro-service 2202, an agent 2208 or container 2210 has been successfully initiated or is missing certain inputs, etc.). In another example, the visualization module 2214 can show test results once the test of application 2212 has been completed. In example embodiments, the visualization module 2214 is an extension of the visualization module 216, and can allow for review of test results, analysis results, etc.

The disclosed framework can also enable automated provisioning of test results from the testing of application 2212 to the analysis module 216 (e.g., via the integrator 2206). For example, the reporting module 302 (not shown) of the analysis module 216 can thereafter be relied upon to generate an interim report showing the results of the testing.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in the enterprise system 6 or the device 4, or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for automating analysis of executed performance testing, the device comprising:
   a processor;
   a communications module coupled to the processor; and
   a memory coupled to the processor, the memory storing computer executable instructions that when executed by the processor cause the processor to:
      receive an input associated with executing a performance test of an application;
      identify a test analysis template from a plurality of test analysis templates based on the performance test or the application associated with the input, each test analysis template defining analysis parameters for interpreting results of executed performance tests, each test analysis template being separate from a definition of the performance test being performed and being separate from one or more models associated with the analysis parameters and used to analyze results of the performance test;
      use the identified test analysis template to create an analysis session to analyze a result of the performance test being executed;
      within the analysis session:
         obtain the result of the performance test;
         select one or more models to be used to analyze the result based on the analysis parameters specified in the identified test analysis template, wherein at least one model is accessed from a remote source;
         utilize the one or more models to analyze the result;
         generate analysis results; and
         generate a performance analysis report based on the analysis results.

2. The device of claim 1, wherein the computer executable instructions cause the processor to provide the performance analysis report to a dashboard which provides results of an automated testing process.

3. The device of claim 2, wherein the dashboard aggregates the performance analysis report with reports from previous sessions associated with the application, or an associated project.

4. The device of claim 1, wherein the performance test is an interim performance test which tests the application in a simplified environment, and the performance test analysis report is in the form of an email.

5. The device of claim 1, wherein the computer executable instructions cause the processor to provide a testing template user interface listing at least one of the test analysis templates, an available existing test analysis template, and a tool to create a new test analysis template.

6. The device of claim 1, wherein the computer executable instructions cause the processor to:
   automatically execute the performance test in response to determining the input is from a microservice associated with performance testing.

7. The device of claim 1, wherein the test analysis template is adjusted based on adjustments within an application inventory defining operating parameters of the application.

8. The device of claim 1, wherein the input is for executing more than one performance test, and the computer executable instructions to create the analysis session cause the processor to:
   create separate analysis sessions for each executed performance test of the more than one performance tests.

9. The device of claim 1, wherein the computer executable instructions further cause the processor to:
   detect a test engine associated with the performance test; and,
   wherein the created analysis session is configured to receive output in a form output by the detected test engine.

10. The device of claim 1, wherein the analysis session is associated with the results, and a designated user account.

11. The device of claim 1, wherein the analysis parameters define a format of the performance analysis report.

12. The device of claim 1, wherein the analysis parameters define criteria associated with one or more of capacity analysis, middleware analysis, database analysis, testing iteration performance, service requirements of the application, and service requirements of a project associated with the application.

13. A method for automating performance testing analyses, the method comprising:
   receiving an input associated with executing a performance test of an application;
   identifying a test analysis template from a plurality of test analysis templates based on the performance test or the application in association with the input, each test analysis template defining analysis parameters for interpreting results of executed performance tests, each test analysis template being separate from a definition of the performance test being performed and being separate from one or more models associated with the analysis parameters and used to analyze results of the performance test;
   creating an analysis session to analyze a result of the performance test being executed;
   within the analysis session:
      obtaining the result of the performance test;
      selecting one or more models to be used to analyze the result based on the analysis parameters specified in the identified test analysis template, wherein at least one model is accessed from a remote source;
      utilizing the one or more models to analyze the result;
      generating analysis results; and
      generating a performance analysis report based on the analysis results.

14. The method of claim 13, wherein the test analysis template is adjusted based on adjustments within an application inventory defining operating parameters of the application.

15. The method of claim 13, comprising:
   providing the performance analysis report to a dashboard which provides results of an automated testing process.

16. The method of claim 15, wherein the dashboard aggregates the performance analysis report with reports from previous sessions associated with the application, or an associated project.

17. The method of claim 13, wherein the performance test is an interim performance test which tests the application in a simplified environment, and the performance test analysis report is in the form of an email.

18. The method of claim 13, wherein the input is for executing more than one performance tests, the method comprising:
creating separate analysis sessions for each executed performance test of the more than one performance tests.

19. The method of claim 13, further comprising:
detecting a test engine associated with the performance test; and,
wherein the created analysis session is configured to receive output in a form output by the detected test engine.

20. A non-transitory computer readable medium for automating performance testing analyses, the computer readable medium comprising computer executable instructions for:
receiving an input associated with executing a performance test of an application;
identifying a test analysis template from a plurality of test analysis templates based on the performance test or the application in association with the input, each test analysis template defining analysis parameters for interpreting results of executed performance tests, each test analysis template being separate from a definition of the performance test being performed and being separate from one or more models associated with the analysis parameters and used to analyze results of the performance test;
creating an analysis session to analyze a result of the performance test being executed;
within the analysis session;
obtaining the result of the performance test;
selecting one or more models to be used to analyze the result based on the analysis parameters specified in the identified test analysis template, wherein at least one model is accessed from a remote source;
utilizing the one or more models to analyze the result;
generating analysis results; and
generating a performance analysis report based on the analysis results.

* * * * *